(12) United States Patent
Shilts et al.

(10) Patent No.: US 9,547,316 B2
(45) Date of Patent: Jan. 17, 2017

(54) THERMOSTAT CLASSIFICATION METHOD AND SYSTEM

(71) Applicant: Opower, Inc., Arlington, VA (US)

(72) Inventors: Erik Shilts, Washington, DC (US); Jonathan Z. Ben-Meshulam, Brooklyn, NY (US); Richard Tyler Curtis, Washington, DC (US)

(73) Assignee: OPOWER, INC., Arlington, VA (US)

( * ) Notice: Subject to any disclaimer, the term of this patent is extended or adjusted under 35 U.S.C. 154(b) by 777 days.

(21) Appl. No.: 13/799,550

(22) Filed: Mar. 13, 2013

(65) Prior Publication Data

US 2014/0074300 A1    Mar. 13, 2014

Related U.S. Application Data

(60) Provisional application No. 61/698,212, filed on Sep. 7, 2012.

(51) Int. Cl.
| | | |
|---|---|---|
| *G05D 23/00* | (2006.01) | |
| *G06Q 50/06* | (2012.01) | |
| *G05D 23/01* | (2006.01) | |

(52) U.S. Cl.
CPC .............. *G05D 23/01* (2013.01); *G06Q 50/06* (2013.01)

(58) Field of Classification Search
None
See application file for complete search history.

(56) References Cited

U.S. PATENT DOCUMENTS

| | | |
|---|---|---|
| 4,334,275 A | 6/1982 | Levine |
| 4,843,575 A | 6/1989 | Crane |
| 5,513,519 A | 5/1996 | Cauger et al. |
| 5,566,084 A | 10/1996 | Cmar |
| 5,717,609 A | 2/1998 | Packa et al. |
| 5,855,011 A | 12/1998 | Tatsuoka |
| 5,873,251 A | 2/1999 | Iino |

(Continued)

FOREIGN PATENT DOCUMENTS

| | | |
|---|---|---|
| AU | 2010315015 | 7/2014 |
| CA | 2779754 | 5/2011 |

(Continued)

OTHER PUBLICATIONS

Eckmann et al., "Ergodic theory of chaos and strange attractors," *Reviews of Modern Physics*, vol. 57, No. 3, Part I, pp. 617-656, Jul. 1985.

(Continued)

*Primary Examiner* — Mohammad Ali
*Assistant Examiner* — Kelvin Booker

(57) ABSTRACT

The disclosure provides a computer-implemented method and system of reducing commodity usage by providing tailored consumer information to the consumer. The method utilizes neural network and machine learning techniques to calculate and cluster statistical data to classify the premises for desired observable condition, including the presence of a programmed thermostat. A score is determined that corresponds to at least one of: (i) a present state of an observable condition, (ii) a non-present state of the observable condition, and (iii) a degree of a condition of the observable condition, to provide tailored consumer information associated to the consumer's usage of the commodity.

23 Claims, 32 Drawing Sheets

(56) References Cited

U.S. PATENT DOCUMENTS

| | | |
|---|---|---|
| 5,930,773 A | 7/1999 | Crooks et al. |
| 5,930,803 A | 7/1999 | Becker et al. |
| 5,948,303 A | 9/1999 | Larson |
| 6,035,285 A | 3/2000 | Schlect et al. |
| 6,088,688 A | 7/2000 | Crooks et al. |
| 6,169,981 B1* | 1/2001 | Werbos ............... G05B 13/0265 706/15 |
| 6,295,504 B1 | 9/2001 | Ye et al. |
| 6,327,605 B2 | 12/2001 | Arakawa et al. |
| D462,077 S | 8/2002 | Greminger |
| 6,606,104 B1 | 8/2003 | Kondo et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1* | 11/2006 | Hoffberg ................ G06F 3/00 382/155 |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. .................... 707/200 |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| D605,652 S | 12/2009 | Plaisted et al. |
| 7,878,890 B2 | 2/2011 | Toyohara et al. |
| 7,991,513 B2 | 8/2011 | Pitt |
| 8,065,098 B2 | 11/2011 | Gautam |
| 8,166,047 B1 | 4/2012 | Cohen et al. |
| D660,867 S | 5/2012 | Marchetti |
| 8,180,591 B2 | 5/2012 | Yuen et al. |
| 8,195,313 B1* | 6/2012 | Fadell ................ F24F 11/0009 236/1 C |
| D665,411 S | 8/2012 | Rai et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| D671,550 S | 11/2012 | Chen et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,428,785 B2 | 4/2013 | Boucher et al. |
| 8,429,630 B2 | 4/2013 | Nickolov et al. |
| 8,478,447 B2 | 7/2013 | Fadell et al. |
| 8,489,245 B2 | 7/2013 | Carrel et al. |
| D687,445 S | 8/2013 | Fuhrmann |
| D694,252 S | 11/2013 | Helm |
| 8,583,288 B1* | 11/2013 | Rossi ................ G05D 23/1917 700/276 |
| D697,526 S | 1/2014 | Bruck et al. |
| 8,630,740 B2* | 1/2014 | Matsuoka ............ H04L 12/2825 700/12 |
| 8,630,741 B1 | 1/2014 | Matsuoka et al. |
| 8,660,813 B2 | 2/2014 | Curtis et al. |
| D703,690 S | 4/2014 | MacCubbin et al. |
| 8,690,751 B2 | 4/2014 | Auphan |
| 8,727,611 B2* | 5/2014 | Huppi .................... G01K 1/16 236/51 |
| 8,737,986 B2* | 5/2014 | Rhoads ............. G01C 21/3629 455/426.1 |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby et al. |
| 8,818,758 B1 | 8/2014 | Singh et al. |
| D714,335 S | 9/2014 | Cojuangco et al. |
| 8,850,348 B2* | 9/2014 | Fadell ................ G05D 23/1902 236/46 R |
| 8,868,248 B2 | 10/2014 | Park |
| D717,328 S | 11/2014 | Lin |
| D720,767 S | 1/2015 | Miller et al. |
| 8,954,849 B2 | 2/2015 | Doi et al. |
| D725,133 S | 3/2015 | Smirin et al. |
| D725,664 S | 3/2015 | Nies et al. |
| D729,268 S | 5/2015 | Nies et al. |
| D730,386 S | 5/2015 | Ryan et al. |
| 9,026,473 B2* | 5/2015 | Chassin ................ G06Q 30/08 361/601 |
| 9,031,703 B2 | 5/2015 | Nakamura et al. |
| D731,538 S | 6/2015 | Lee |
| D732,049 S | 6/2015 | Amin |
| D732,062 S | 6/2015 | Kwon |
| 9,081,405 B2* | 7/2015 | Weaver .................... H02J 3/14 |
| 9,115,908 B2* | 8/2015 | Shetty .................. F24F 11/006 |
| D740,847 S | 10/2015 | Yampolskiy et al. |
| 2001/0047290 A1 | 11/2001 | Petras et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0117330 A1* | 6/2004 | Ehlers ................ F24F 11/0012 705/412 |
| 2004/0140908 A1* | 7/2004 | Gladwin ................ G01D 4/00 340/870.02 |
| 2005/0257540 A1 | 11/2005 | Choi et al. |
| 2006/0089851 A1 | 4/2006 | Silby et al. |
| 2006/0093222 A1 | 5/2006 | Saffer et al. |
| 2006/0103549 A1 | 5/2006 | Hunt et al. |
| 2006/0195438 A1 | 8/2006 | Galuten |
| 2006/0246968 A1 | 11/2006 | Dyke-Wells |
| 2006/0276938 A1* | 12/2006 | Miller .................... G06Q 50/06 700/295 |
| 2007/0061735 A1* | 3/2007 | Hoffberg ................ G06F 9/4443 715/744 |
| 2007/0185835 A1 | 8/2007 | Ursitti et al. |
| 2007/0198459 A1 | 8/2007 | Boone et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0033587 A1 | 2/2008 | Kurita et al. |
| 2008/0167535 A1 | 7/2008 | Stivoric et al. |
| 2008/0189632 A1 | 8/2008 | Tien et al. |
| 2008/0195561 A1* | 8/2008 | Herzig .................... G06Q 30/04 705/412 |
| 2008/0222561 A1 | 9/2008 | Helfman et al. |
| 2008/0244429 A1 | 10/2008 | Stading |
| 2008/0281473 A1* | 11/2008 | Pitt .................... G06Q 30/02 700/291 |
| 2008/0281763 A1 | 11/2008 | Yliniemi |
| 2008/0304112 A1 | 12/2008 | Matsuno |
| 2008/0306955 A1 | 12/2008 | Murray et al. |
| 2009/0106202 A1 | 4/2009 | Mizrahi |
| 2009/0106674 A1 | 4/2009 | Bray et al. |
| 2009/0204267 A1* | 8/2009 | Sustaeta ............. G05B 13/0285 700/291 |
| 2009/0217175 A1 | 8/2009 | Bechtel et al. |
| 2009/0217179 A1 | 8/2009 | Mons et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0106575 A1 | 4/2010 | Bixby et al. |
| 2010/0138363 A1 | 6/2010 | Batterberry et al. |

(56) References Cited

U.S. PATENT DOCUMENTS

| | | | |
|---|---|---|---|
| 2010/0156665 A1* | 6/2010 | Krzyzanowski | G01D 4/004 340/870.02 |
| 2010/0179704 A1 | 7/2010 | Ozog | |
| 2010/0180223 A1 | 7/2010 | Speier | |
| 2010/0198713 A1 | 8/2010 | Forbes, Jr. et al. | |
| 2010/0217452 A1* | 8/2010 | McCord | G06Q 50/06 700/295 |
| 2010/0217549 A1* | 8/2010 | Galvin | H04B 3/54 702/62 |
| 2010/0217550 A1* | 8/2010 | Crabtree | H02J 13/0079 702/62 |
| 2010/0217642 A1* | 8/2010 | Crubtree | G06Q 10/00 705/7.12 |
| 2010/0217651 A1* | 8/2010 | Crabtree | G06Q 10/00 705/7.22 |
| 2010/0232671 A1 | 9/2010 | Dam et al. | |
| 2010/0241648 A1 | 9/2010 | Ito et al. | |
| 2010/0286937 A1 | 11/2010 | Hedley et al. | |
| 2010/0289643 A1 | 11/2010 | Trundle et al. | |
| 2010/0324962 A1 | 12/2010 | Nesler et al. | |
| 2010/0332373 A1* | 12/2010 | Crabtree | G06Q 50/06 705/37 |
| 2011/0015802 A1* | 1/2011 | Imes | G05D 23/1923 700/300 |
| 2011/0022429 A1 | 1/2011 | Yates et al. | |
| 2011/0023045 A1 | 1/2011 | Yates et al. | 718/104 |
| 2011/0040666 A1 | 2/2011 | Crabtree et al. | |
| 2011/0046792 A1* | 2/2011 | Imes | F24F 11/0086 700/278 |
| 2011/0061014 A1* | 3/2011 | Frader-Thompson | G01D 4/002 715/771 |
| 2011/0063126 A1* | 3/2011 | Kennedy | G01D 4/002 340/870.02 |
| 2011/0106316 A1 | 5/2011 | Drew et al. | |
| 2011/0106328 A1* | 5/2011 | Zhou | G05B 13/024 700/291 |
| 2011/0106471 A1 | 5/2011 | Curtis et al. | |
| 2011/0153102 A1* | 6/2011 | Tyagi | G06Q 10/04 700/291 |
| 2011/0161076 A1* | 6/2011 | Davis | G06F 3/04842 704/231 |
| 2011/0178842 A1 | 7/2011 | Rane et al. | |
| 2011/0178937 A1 | 7/2011 | Bowman | |
| 2011/0202185 A1* | 8/2011 | Imes | H04L 43/08 700/277 |
| 2011/0205245 A1 | 8/2011 | Kennedy et al. | |
| 2011/0231320 A1* | 9/2011 | Irving | G06Q 30/00 705/80 |
| 2011/0251730 A1 | 10/2011 | Pitt | |
| 2011/0251807 A1 | 10/2011 | Rada et al. | |
| 2011/0282505 A1 | 11/2011 | Tomita et al. | |
| 2011/0313964 A1 | 12/2011 | Sanchey Loureda et al. | |
| 2012/0036250 A1* | 2/2012 | Vaswani | G01D 4/004 709/224 |
| 2012/0046859 A1* | 2/2012 | Imes | G05D 23/1905 701/409 |
| 2012/0053740 A1 | 3/2012 | Venkatakrishnan et al. | 700/291 |
| 2012/0064923 A1* | 3/2012 | Imes | G05B 15/02 455/457 |
| 2012/0066168 A1 | 3/2012 | Fadell et al. | |
| 2012/0078417 A1 | 3/2012 | Connell, II et al. | |
| 2012/0084063 A1 | 4/2012 | Drees et al. | |
| 2012/0179692 A1 | 7/2012 | Hsiao et al. | |
| 2012/0203379 A1* | 8/2012 | Sloo | F24F 11/0086 700/276 |
| 2012/0215369 A1 | 8/2012 | Desai et al. | |
| 2012/0216123 A1 | 8/2012 | Shklovskii et al. | |
| 2012/0259678 A1 | 10/2012 | Overturf et al. | |
| 2012/0290230 A1* | 11/2012 | Berges Gonzalez | G01D 4/004 702/61 |
| 2012/0310708 A1 | 12/2012 | Curtis et al. | |
| 2013/0060531 A1 | 3/2013 | Burke et al. | |
| 2013/0060720 A1 | 3/2013 | Burke | |
| 2013/0097177 A1 | 4/2013 | Fan et al. | |
| 2013/0097481 A1 | 4/2013 | Kotler et al. | |
| 2013/0173064 A1* | 7/2013 | Fadell | G05D 23/1902 700/276 |
| 2013/0253709 A1 | 9/2013 | Renggli et al. | |
| 2013/0261799 A1 | 10/2013 | Kuhlmann et al. | |
| 2013/0262040 A1 | 10/2013 | Buckley | |
| 2013/0268129 A1* | 10/2013 | Fadell | G06Q 10/20 700/278 |
| 2013/0338839 A1* | 12/2013 | Rogers | G05D 23/1917 700/278 |
| 2013/0345882 A1* | 12/2013 | Dushane | G05B 15/02 700/276 |
| 2014/0006314 A1 | 1/2014 | Yu et al. | |
| 2014/0019319 A1 | 1/2014 | Derby et al. | |
| 2014/0052300 A1* | 2/2014 | Matsuoka | F24F 11/0086 700/276 |
| 2014/0107850 A1* | 4/2014 | Curtis | F24F 11/001 700/291 |
| 2014/0148706 A1 | 5/2014 | Van Treeck et al. | |
| 2014/0163746 A1 | 6/2014 | Drew et al. | |
| 2014/0207292 A1 | 7/2014 | Ramagem et al. | |
| 2014/0316581 A1* | 10/2014 | Fadell | F24F 11/0009 700/276 |
| 2014/0337107 A1 | 11/2014 | Foster | |
| 2015/0094968 A1* | 4/2015 | Jia | G06Q 40/04 702/60 |
| 2015/0227522 A1 | 8/2015 | O'Donnell et al. | |
| 2015/0227846 A1 | 8/2015 | Mercer et al. | |
| 2015/0254246 A1 | 9/2015 | Sheth et al. | |
| 2015/0267935 A1 | 9/2015 | Devenish et al. | |
| 2015/0269664 A1 | 9/2015 | Davidson | |
| 2015/0300831 A1 | 10/2015 | Sernicola | |
| 2015/0308705 A1* | 10/2015 | Sloo | F24F 11/0086 700/276 |
| 2015/0310019 A1 | 10/2015 | Royer et al. | |
| 2015/0310463 A1 | 10/2015 | Turfboer et al. | |
| 2015/0310465 A1 | 10/2015 | Chan et al. | |
| 2015/0319119 A1 | 11/2015 | Ryu et al. | |
| 2015/0324819 A1 | 11/2015 | Lin et al. | |
| 2015/0326679 A1 | 11/2015 | Lin et al. | |

FOREIGN PATENT DOCUMENTS

| | | | |
|---|---|---|---|
| CA | 2832211 | 11/2012 | |
| DE | 3703387 | 8/1987 | |
| DE | 102011077522 | 12/2012 | |
| EP | 0003010 | 7/1979 | |
| EP | 2705440 | 3/2014 | |
| EP | 2496991 | 9/2014 | |
| GB | 1525656 | 9/1978 | |
| GB | 2238405 | 5/1991 | |
| JP | 2000-270379 | 9/2000 | |
| JP | 2004-233118 | 8/2004 | G01R 22/00 |
| JP | 2006-119931 | 5/2006 | |
| JP | 2007-133468 | 5/2007 | |
| JP | 2011-027305 | 2/2011 | F24F 11/02 |
| JP | 2012-080679 | 4/2012 | |
| JP | 2012-080681 | 4/2012 | |
| JP | 2013-020307 | 1/2013 | |
| WO | WO 03/102865 | 12/2003 | |
| WO | WO 03/104941 | 12/2003 | |
| WO | WO 2008/101248 | 8/2008 | |
| WO | WO 2009/085610 | 7/2009 | |
| WO | WO 2011/057072 | 5/2011 | G05B 15/02 |
| WO | WO 2012-112358 | 8/2012 | F24D 19/10 |
| WO | WO 2012/154566 | 11/2012 | |
| WO | WO 2014/004148 | 1/2014 | |
| WO | WO 2014/182656 | 11/2014 | |

OTHER PUBLICATIONS

Espinoza et al., "Short-Term Load Forecasting, Profile Identification, and Customer Segmentation: A Methodology Based on Periodic Time Series," *IEEE Transactions on Power Systems*, vol. 20, No. 3, pp. 1622-1630, Aug. 2005.

(56) References Cited

OTHER PUBLICATIONS

Figueiredo et al., "An Electric Energy Consumer Characterization Framework Based on Data Mining Techniques," *IEEE Transactions on Power Systems*, vol. 20, No. 2, pp. 596-602, May 2005.
Friedman et al., "Regularization Paths for Generalized Linear Models via Coordinate Descent," *Journal of Statistical Sotfware*, vol. 33, Iss. 1, pp. 1-22, Jan. 2010.
Mori, State-of-the-Art Overview on Data Mining in Power Systems, *IEEE*, pp. 33-37 (2006).
Rose, "Estimation of the Hurst Parameter of Long-Range Dependent Time Series," *University of Würzburg, Institue of Computer Science, Research Report Series*, Report No. 137, 15 pages, Feb. 1996.
Stoop et al., "Calculation of Lyapunov exponents avoiding spurious elements," *Physica D*, vol. 50, Iss. 1, pp. 89-94, May 1991.
Wang et al., "Characteristic-Based Clustering for Time Series Data," *Data Mining and Knowledge Discovery, Springer Science & Business Media, LLC*, vol. 13, pp. 335-364 (2006).
Wang et al., "Rule induction for forecasting method selection: meta-learning the characteristics of univariate time series," *Faculty of information Technology, Department of Econometrics and Business Statistics, Monash University*, pp. 1-34.
Wehrens et al., "Self- and Super-organizing Maps in R: The kohonen Package," *Journal of Statistical Software*, vol. 21, Iss. 5, pp. 1-19, Oct. 2007.
International Searching Authority, International Search Report—International Application No. PCT/US2013/050501, dated Oct. 15, 2013, together with the Written Opinion of the International Searching Authority, 10 pages.
International Search Report and Written Opinion for PCT Application No. PCT/US2015/038692, mailed Sep. 24, 2015, 13 pages.
International Preliminary Report on Patentability for PCT Application No. PCT/US2010/055621, mailed May 15, 2012, 8 pages.
International Search Report and Written Opinion for PCT Application No. PCT/US2010/055621, mailed Dec. 23, 2010, 9 pages.
International Search Report and Written Opinion for PCT Application No. PCT/US2012/036539, mailed Jul. 6, 2012, 8 pages.
International Preliminary Report on Patentability for PCT Application No. PCT/US2012/036539, mailed Nov. 21, 2013, 7 pages.
International Search Report and Written Opinion for PCT Application No. PCT/US2013/046126, mailed Aug. 22, 2013, 9 pages.
International Preliminary Report on Patentability for PCT Application No. PCT/US2013/046126, mailed Jan. 8, 2015, 8 pages.
International Search Report for PCT Application No. PCT/US2014/036901, mailed Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Aragon, Liz, "Black and White Emoticons," posted at Sweet Clip Art, posting date Apr. 29, 2012. © 2011 2015 Elizabeth J. Aragon, available at http://sweatclipart.com/blackandwhiteemoticons838>.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May 19, 2008, 15 pages, available at http://web.archive.orgi/web/20080519220643/bie.berkeley.edu/coolcalc/calculations.html.
Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.
Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Blaine, Joel, "Seven Cities and a Utility Company Team Up to Deliver Energy Savings," posted at Dept. of Energy, posting date Aug. 1, 2011, available at http://energy.gov/articles/sevencitiesandutilitycompanyteamdeliverresidentialenergysavings>.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection via an X-Band Experimental Set-Up," Progress in Electromagnectics Research C, vol. 9, pp. 119-129 (2009).
Fels, Margaret F., "Prism: An Introduction," Elsevier Sequoia, Energy and Buildings, vol. 9, pp. 5-18, 1986.
Fels, Margaret F., et al., Seasonality of Non-heating Consumption and Its effect on Prism Results, Elsevier Sequoia, Energy and Buildings, vol. 9, pp. 139-148, 1986.
Fitbit® Official Site, "Flex, One & Zip Wireless Activity & Sleep Trackers," http://www.fitbit.com/, 4 pages, Jul. 15, 2013.
Freepik, Surprised emoticon square face with open eyes and mouth, posted at Flat Icon, posting date not given. © 2013-2015 Graphic Resources SL, available at http://www.flaticon.com/freeicon/surprisedemoticonsquarefacewithopeneyesandmouth_42835>.
Gelber, Bob, "This Is Not a Bill," posted at Not a Mystery, posting date Apr. 18, 2015, available at http://notamystery.com/2015/04/18/not_worth_the_papeUls_on/>.
Goldberg, Miriam L., et al., "Refraction of Prism Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Karsten, "Green nudge: The classic social comparison experiment by Opower," posted at iNudgeyou, posting date Nov. 28, 2012, available at http://inudgeyou.com/greennudgetheclassicsocialcomparisonexperimenbyopwer/>.
Laskey, Alex, et al., "OPOWER," posted at ACM, posting date Jun. 2011, Copyright © 2015 by the ACM, available at http://xrds.acm.org/article.cfm?aid=1961687>.
Leisch, Friedrich, "FlexMix: A General Framework for Finite Mixture Models and Latent Class Regression in R," Journal of Statistical Software, http://www.jstatsoft.org/, vol. 11 (8), pp. 1-18, Oct. 2004.
Liang, Jian, et al. "Load Signature Study-Part II: Disaggregation Framework, Simulation, and Applications," IEEE Transactions on Power Delivery, vol. 25, No. 2, pp. 561-569, Apr. 2010.
Liang, Jian, et al., "Load Signature Study-Part I: Basic Concept, Structure, and Methodology," IEEE Transactions on Power Delivery, vol. 25, No. 2, pp. 551-560, Apr. 2010.
Marshall, Jonathan, "PG&E Home Energy Reports Stimulate Big Customer Savings," posted at PG&E Currents, posting date May 14, 2014, © 2014 Pacific Gas and Electric Company, available at http://www.pgecurrents.com/2014/05/14/pgehomeenergyreports-stimulatebigcustomersavings/>.

(56) References Cited

OTHER PUBLICATIONS

Mint.com, "Budgets you'll actually stick to," Budgeting-Calculate and Categorize your spending, https://www.mint.com/how-it-works/budgeting/, 2 pages, Jul. 12, 2013.

Mint.com, "We're always on alert." Alerts for bills, fees & going over budget, https://www.mint.com/how-it-works/alerts/, 2 pages, Jul. 12, 2013.

Morabito, Kerri, "High User Campaign," posted at Kerri Morabito, posting date not given, © Kerri Morabito, 2015, available at <URL: http://www.kerrimorabito.com/high-user-campaign.html>.

Muthen, Bengt, et al., Finite Mixture Modeling with Mixture Outcomes Using the EM Algorithm, Biometrics, vol. 55, pp. 463-469, Jun. 1999.

Nest, "The Learning Thermostat," http://www.nest.com/, 2 pages, Jul. 15, 2013.

Nike.com, "Nike + FuelBand. Tracks your all-day activity and helps you do more . . . ," http://www.nike.com/us/en_us/c/nikeplus-f.. uelband,_7 pages, Jul. 15, 2013.

Rocheleau, Jake, "38 Amazingly Well-Designed Emoji Iconsets," posted at SpyreStudios, posting date Mar. 25, 2015, SpryeStudios © 2015, available at http://spyrestudios.com/38welldesignedemojiiconsets/>.

Sawka, Michael N., et al., "Human Adaptations to Heat and Cold Stress," RTOMP-076, 16 pages, Oct. 2001.

Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.

Wikipedia, "Akaike information criterion," 6 pages, Aug. 17, 2012.

Wikipedia, "Mixture model," 10 pages, Oct. 7, 2012.

\* cited by examiner

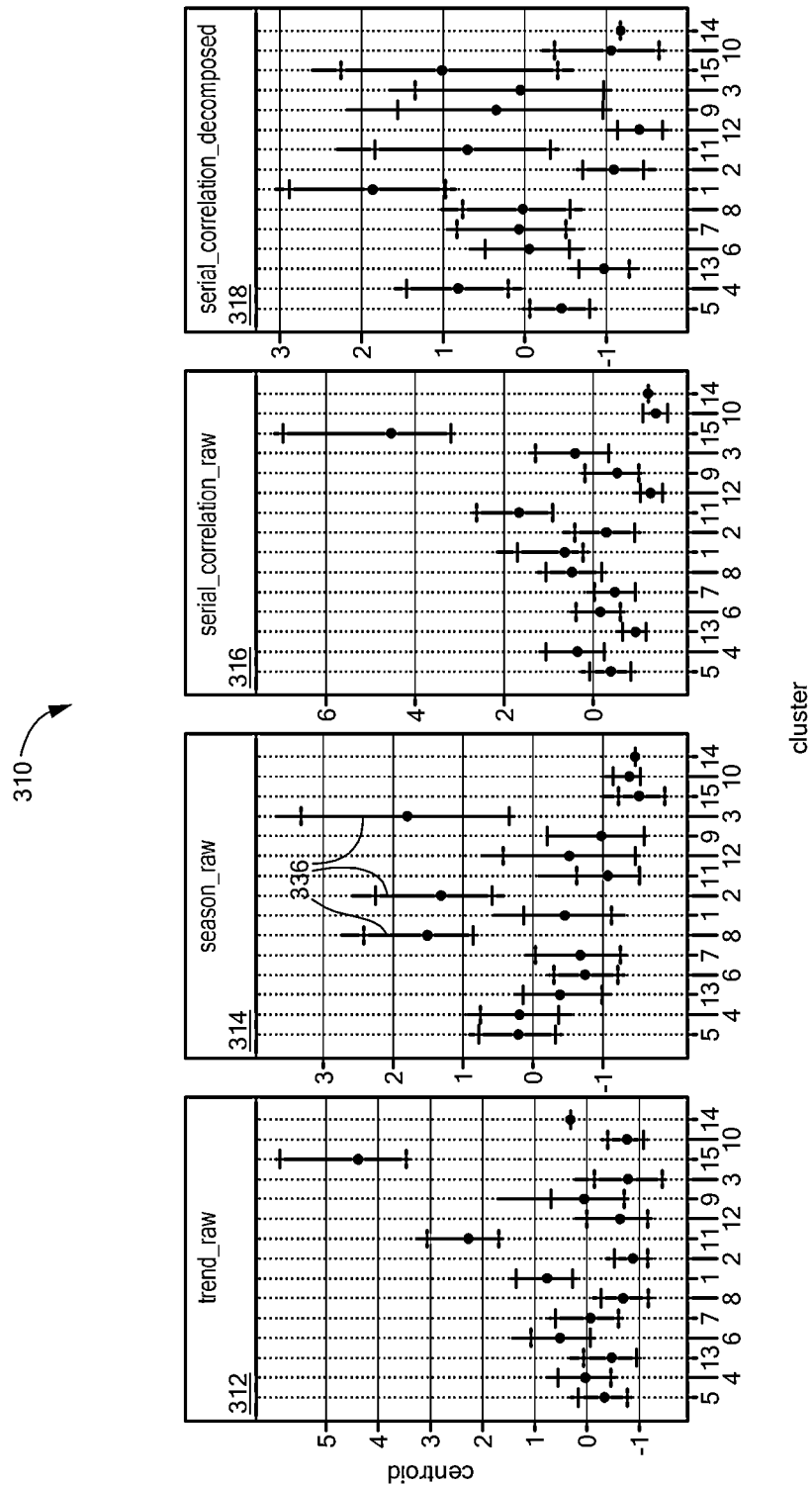
FIG. 3B-A

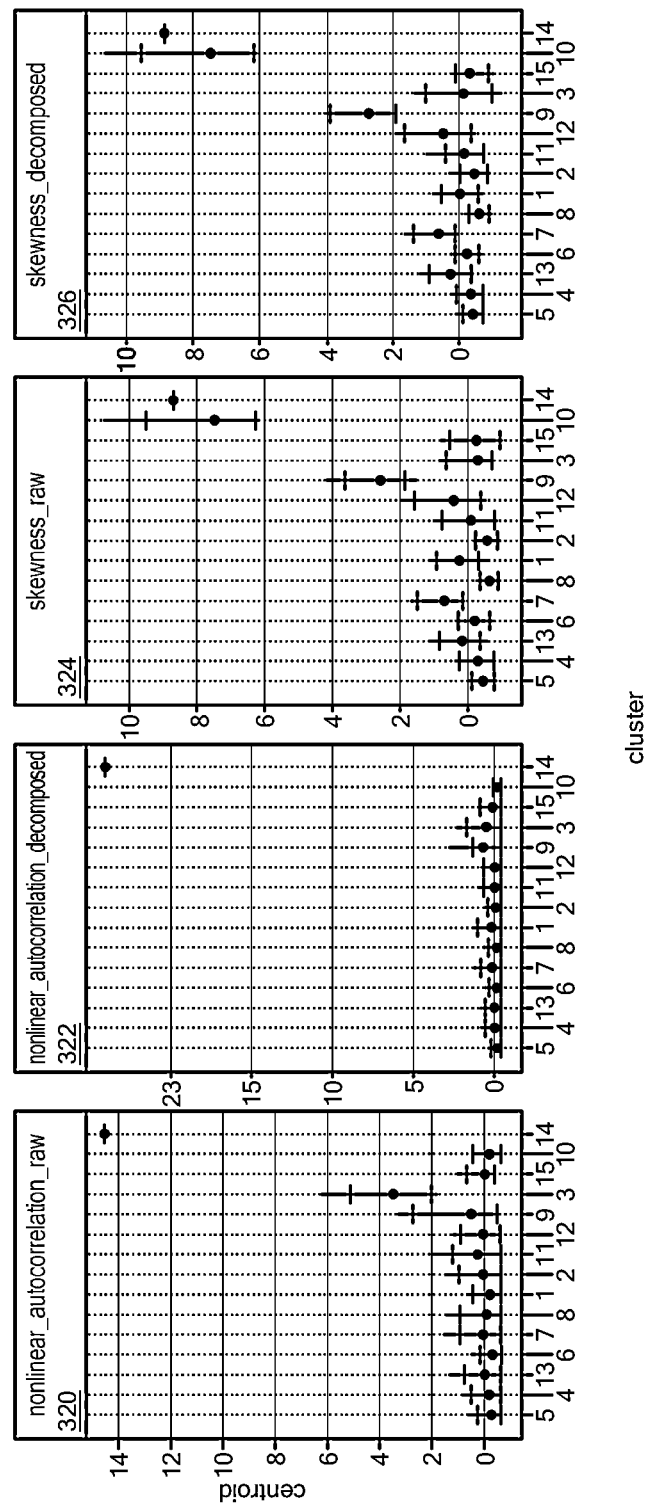
FIG. 3B-B

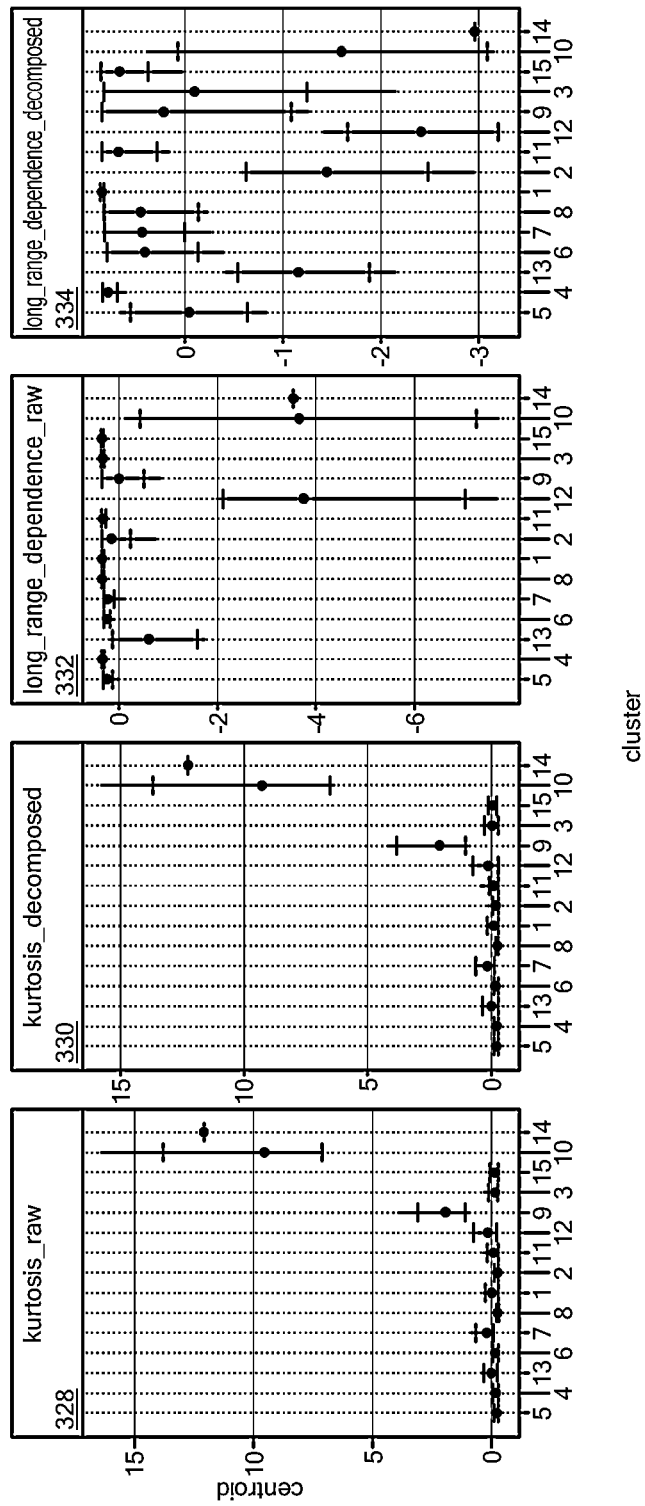
FIG. 3B-C

- trend_raw
- season_daily_raw
- season_weekly_raw
- season_al_raw
- serial_correlation_raw

- serial_correlation_decomposed
- nonlinear_autocorrelation_raw
- nonlinear_autocorrelation_decomposed
- skewness_raw
- skewness_decomposed

- kurtosis_raw
- kurtosis_decomposed
- long_range_dependence_raw
- long_range_dependence_decomposed

- trend_raw
- season_daily_raw
- season_weekly_raw
- season_al_raw
- serial_correlation_raw

- serial_correlation_decomposed
- nonlinear_autocorrelation_raw
- nonlinear_autocorrelation_decomposed
- skewness_raw
- skewness_decomposed

- kurtosis_raw
- kurtosis_decomposed
- long_range_dependence_raw
- long_range_dependence_decomposed

THERMOSTAT CLASSIFICATION METHOD AND SYSTEM

RELATED APPLICATION

The present application claims priority from Provisional Application No. 61/698,212, filed Sep. 7, 2012, titled "Thermostat Classification Method and System." The application is incorporated by reference herein in its entirety.

TECHNICAL FIELD

The present invention relates to reducing energy usage, more particularly, to remotely ascertain if a premises employs a programmed thermostat and make recommendations depending on whether such a thermostat is or is not employed.

BACKGROUND ART

Heating, cooling, and conditioning the environment condition of a building generally account for a substantial portion of energy usage within a residential building. Occupants of residential buildings may employ programmable thermostats (also referred to as setback thermostats or clock thermostats) to control or adjust the temperature set-points in the buildings. The building occupants may program their programmable thermostat to reduce the heating or cooling operation over a portion of the day, for example, when the premises are vacated or when the occupants are asleep. A programmable thermostat may also include control devices that receive a control signal, including a temperature set-point or a setback signal, via a communication port from an external source, to control or adjust its set-point or to temporarily disable its heating or cooling function.

SUMMARY OF THE EMBODIMENTS

An embodiment provides a computer-implemented method of reducing commodity usage by providing tailored consumer information to a consumer. The computer-implemented method includes receiving energy usage data of a consumer associated with a premises. The premises may have a controller (such as a thermostat) to regulate the temperature in a controlled space within the premises. The energy usage data may be associated in part to the regulation of the controller in that the heating, cooling, or conditioning are regulated by the controller and account for a portion of the total energy used at the premises.

The computer-implemented method includes determining a status of whether the controller adjusts the temperature according to a time-of-day dependent setting using the received energy usage data. The energy usage data may be historical data from past billing cycles or may be recently received usage data within a current bill cycle as retrieved from a communicating meter. The energy usage data may be retrieved directly from the meter or indirectly from the utility or a service provider managing the meter.

Upon determining the status of the premises of having a programmed thermostat or an unprogrammed thermostat, the computer-implemented method includes tailoring consumer information to be provided to the consumer to reduce usage.

According to an embodiment, to determine the status of the premises using the energy usage data, the computer system may compare a statistical feature derived from the received energy usage data to a second statistical feature derived from at least one representative pattern of a premises. This representative pattern may correspond to a pattern of a controller that either adjusts or does not adjust the temperature according to a time-of-day dependent setting.

According to another embodiment, the computer system may determine the status of the premises by calculating, using the energy usage data, statistical data related to at least one of seasonality, trend, decomposed data, kurtosis, skewness, serial correlation, non-linear autocorrelation, long range dependence, and chaos. The computer system may assign the calculated statistical data to a representative self-organized map where the map has at least one cluster corresponding to the premises either having or not having a programmed thermostat. The representative self-organized map may be determined from any of various clustering techniques, including k-means, hierarchical clustering, Kohonen self-organizing maps, and other neural networks.

According to another embodiment, the computer system may receive energy usage data for a set of premises. The computer system may calculate, using a portion of the set of energy usage data, a set of statistical data corresponding to at least one of seasonality, trend, decomposed data, kurtosis, skewness, serial correlation, non-linear autocorrelation, long range dependence, and chaos. The computer system may cluster the set of statistical data where a portion of the resulting cluster corresponds to premises having a programmed thermostat and another portion of the resulting cluster corresponds to premises having an unprogrammed thermostat. The computer system may locate i) the energy usage data for a premises within the resulting clusters and ii) the corresponding status for the premises.

According to an embodiment, the computer system may determine the status of the premises by applying the statistical data to a regression model having a set of model coefficients corresponding to a predictor of the status of the premises. The computer system may score the premises using the coefficients to determine whether the controller adjusts the temperature according to a time-of-day dependent setting. The regression model may include a function that minimizes the sum of squared error between a predicted and an actual value of the predictor variable. The computer system may filter, prior to applying the calculated statistical data to the regression model, a portion of the statistical data that is insufficiently predictive, such as, based upon an observed radical change in the model coefficient. The filtering may be performed by at least one of a ridge estimator, a Lasso estimator, and a least angle regression estimator. The predictor variable may include at least one parameter corresponding to seasonality, intercept, trend, decomposed data, kurtosis, skewness, serial correlation, non-linear autocorrelation, long range dependence, chaos, and sensitivity to heating and cooling.

According to another embodiment, the computer system may determine the status of the premises by assigning the calculated statistical data, derived from the energy usage data, to a representative self-organized map where a portion of the map may have an associated regression model. The computer system may apply the statistical data to the associated regression model based on the assignment. The regression model may have a set of coefficients corresponding to a predictor variable of whether the controller adjusts the temperature according to a time-of-day dependent setting. The computer system may score the energy usage data using the coefficients to determine the status of whether the controller adjusts the temperature according to a time-of-day dependent setting.

According to another embodiment, the computer system may determine the status of the premises by calculating a ratio of usage between a first time of the day (such as the evening) and a second time of the day (such as the morning). The computer system may compare the calculated ratio to a user-specific threshold where the comparison provides the status of whether the controller adjusts the temperature according to a time-of-day dependent setting.

According to an embodiment, providing tailored consumer information may include outputting a report to the consumer at the premises based on the determined status of the premises. The report may include a message indicating an estimated reduction in usage and cost if a programmed controller is employed at the premises. The report may, in addition or in lieu of, include an indication of the presence of the malfunctioned heating, ventilation, and air-conditioning (HVAC) system at the premises. The consumer may be categorized into tiers based upon the determined status of the premises.

Another embodiment provides a computer-implemented method of reducing commodity usage by providing tailored consumer information to the consumer. The method includes retrieving usage data of a commodity by a consumer associated to premises of the consumer. The method then includes calculating, from the usage data, statistical data. The statistical data may include, among other things, information related to at least one of seasonality, trend, decomposed data, kurtosis, skewness, serial correlation, non-linear autocorrelation, long range dependence, and chaos. The method then includes classifying the statistical data to generate classified result data by clustering the statistical data. The method then includes scoring the premises using the classified result data to determine, at the premises, at least one of: (i) a present state of an observable condition, (ii) a non-present state of the observable condition, and (iii) a degree of a condition of the observable condition, to provide tailored consumer information associated to the consumer's usage of the commodity.

Among other things, the observable condition may include: (i) whether the premises has a programmed controller configured to control the usage of the commodity, such as a programmable thermostat, (ii) whether the consumer on the premises is present, (iii) the number of consumers present on the premises, (iv) whether the premises has an electric water heater, (v) whether the premises has a malfunctioning heating, ventilation, air-conditioning system, and (vi) the degree of the malfunction of the heating, ventilation, and air-conditioning system.

The clustering performed may be based upon k-means, hierarchical clustering, Kohonen self-organizing maps, or other neural network methods. When the clustering is based upon Kohonen self-organizing maps, the method may include mapping a k-dimension summary statistic onto a j-dimension neural network to derive a distance parameter to generate an observable map; and displaying, via a graphic user-interface, the observable map. The Kohonen self-organizing maps may be supervised or unsupervised. Display of the observable map may be performed at a random portion of the observable map. Alternatively, display of the observable map may be performed for a neighborhood associated to the premises.

The usage data may be retrieved from an advanced meter infrastructure (AMI) meter or a home display system located at the consumer's premises. Conversely, the usage data may be retrieved from a database maintained by a third party service provider or the utilities. The usage data may have an associated interval of an hour or less. The usage data may correspond to a residential customer's premises. The usage data may consist of a time series signal.

The method may further include outputting a report to the consumer based on the observable condition. The report may include a message indicating at least one of an estimated reduction in usage of the commodity. The report may also include an estimated reduction in cost associated with the estimated reduction in usage if the programmed controller is employed at the premises. The report may also include an indication of the presence of the malfunctioned HVAC at the premises.

In accordance with another embodiment, a computer-implemented method of reducing commodity usage by providing tailored consumer information to the consumer is provided. The method includes retrieving usage data of a commodity by a consumer associated to a premises of the consumer for a user-specified range. The method then includes calculating, from the usage data, statistical data related to at least one of seasonality, trend, decomposed data, kurtosis, skewness, serial correlation, non-linear autocorrelation, long range dependence, and chaos. The method then includes establishing a regression model of the statistical data, the regression model having a plurality of model coefficients corresponding to a predictor variable. The method then includes scoring the premises using the coefficients to determine a present state or a non-present state of an observable condition at the premises to provide tailored consumer information to the consumer.

The regression model may be established by minimizing a sum of the squared error between the predicted and actual values.

The computer-implemented method may further include filtering the statistical data to remove a portion of the statistical data that is insufficiently predictive based upon radical change in the model coefficient. Put another way, the statistical data, as input variables to the model, may be restricted from entering the model unless they reduce the prediction error by some amount. The filtering may be performed prior to the regression model is established. The filtering may be performed by at least one of a ridge estimator, a Lasso estimator, and a least angle regression estimator.

Another embodiment provides a computer-implemented method of reducing commodity usage by providing tailored consumer information to the consumer. The method includes retrieving usage data of a commodity by a consumer associated to a premises of the consumer. The method then includes calculating, from the usage data, statistical data. The statistical data may be related to seasonality, trend, decomposed data, kurtosis, skewness, serial correlation, non-linear autocorrelation, long range dependence, and chaos. The method then includes classifying the statistical data to generate classified result data by clustering the statistical data. The method then includes establishing a regression model of the statistical data, the regression model having a plurality of model coefficients corresponding to a predictor variable. The method then includes scoring the premises using the coefficients to determine a present state or a non-present state of an observable condition at the premises to provide tailored consumer information to the consumer.

The observable condition in the various methods may include the conditions previously described. Similarly, the usage data may be of similar manner and similarly operating upon, as described above.

In accordance with another embodiment, a system for reducing commodity usage by providing tailored consumer information to the consumer is provided. The system includes a memory and a control program. The memory is configured to store usage data of a commodity by a consumer associated to the premises of the consumer. The control program is configured to control the memory, retrieve the usage data, and calculate, from the usage data, statistical data related to at least one of seasonality, trend, decomposed data, kurtosis, skewness, serial correlation, non-linear autocorrelation, long range dependence, and chaos. The control program then classifies the statistical data to generate classified result data by clustering the statistical data and score the premises using the classified result data to determine a present state or a non-present state of an observable condition at the premises to provide tailored consumer information to the consumer.

Another embodiment provides a system for reducing commodity usage by providing tailored consumer information to the consumer. The system includes a memory and a control program. The memory is configured to store usage data of a commodity by a consumer associated to a premises of the consumer for a user-specified range. The control program is configured to control the memory and retrieve the usage data. The control program is further configured to establish a regression model of the usage data. The regression model may have a plurality of model coefficients corresponding to a predictor variable and to score the premises using the coefficients to determine a present state or a non-present state of an observable condition at the premises to provide tailored consumer information to the consumer.

In the various described systems, each system may further include a communication port to receive time series data of usage information from an AMI meter and storing the time series data in the memory. The control program may calculate an average usage at every time interval and wherein calculating statistical data is performed from the averaged usage data.

The described method may be employed as a computer program product, which is stored on a machine-readable medium, or computer data signal, embodied by an electromagnetic wave, comprising program code to be executed, particularly, in a computer.

BRIEF DESCRIPTION OF THE DRAWINGS

The foregoing features of embodiments will be more readily understood by references to the following detailed description, taken with reference to the accompanying drawings, in which:

FIGS. 3B-A, 3B-B, and 3B-C show plots of distributions of statistical data of the clustering of FIG. 3A according to an illustrative embodiment.

FIG. 3C shows an exemplary plot of paired statistical data of FIG. 3A according to an illustrative embodiment.

DETAILED DESCRIPTION OF SPECIFIC EMBODIMENTS

Figure 1A:
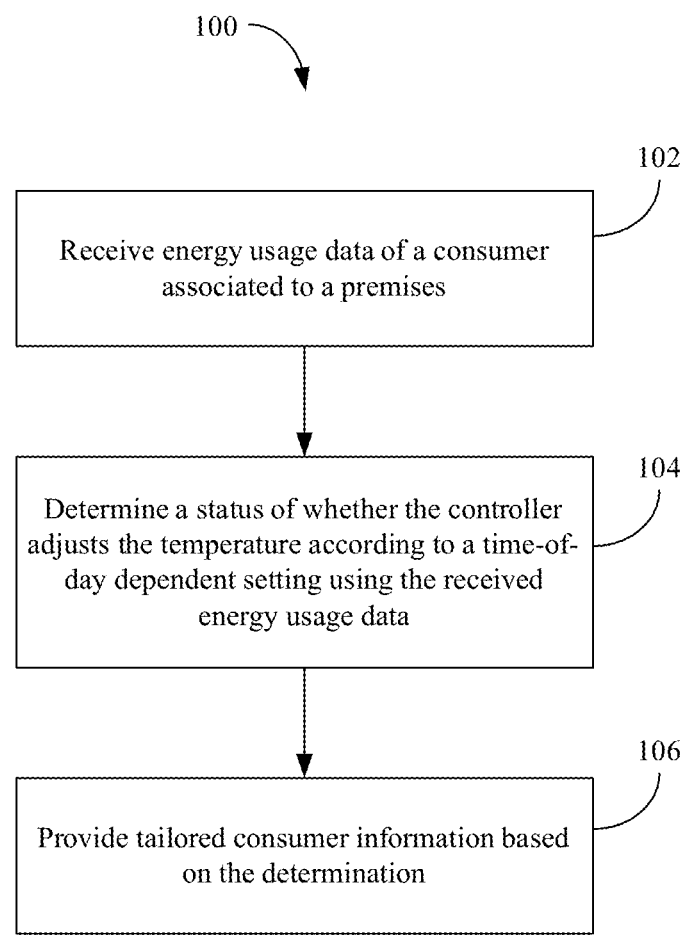
FIG. 1A is a flowchart illustrating a computer-implemented method of reducing commodity usage according to an illustrative embodiment.

The term "usage" refers to either a quantity of use or a cost associated with the use.

The term "commodity" refers to a utility-based product, such as electricity, water or gas, and other finite consumable delivered to a fixed structure.

The term "programmable thermostat" refers to a control system that senses an environment condition, such as temperature and/or humidity, and has adjustable settings (i.e., temperature, humidity, enabled/disabled state) based upon the time of the day, the days of the week, or a user-defined event. A programmable thermostat may be pre-programmed with default values, such as temperature and time, by its manufacturer. The adjustable setting may also be adjusted by the user. The adjustable setting may also be adjusted based upon a trigger signal provided from an external system, such as from a service provider. In an embodiment, a programmable thermostat adjusts the temperature of a controlled space within the premises being regulated by the thermostat according to a time-of-day dependent setting. In another embodiment, the controller may be a part of an energy management system that regulates environment conditions at the premises.

The term "programmed thermostat" refers to a programmable thermostat that has been made active and is operating according to its intended regulating functions.

The term "classification" generally refers to the determination of a status of having a quality present, not present, or a degree of magnitude of the quality.

A programmable thermostat may improve the energy efficiency of a building and reduce the cost to heat and cool the building. As such, utility providers, energy regulators, and government agencies encourage building occupants to employ a programmable thermostat in their respective premises in order to promote energy efficiency and conservation. Utility providers and other like-entities have used programmable thermostats for demand-response-based energy programs.

Regardless of the benefit of employing a programmed programmable thermostat in reducing energy and utility cost, a building occupant may not have one deployed at his or her premises, or the thermostat, even if installed, may not be programmed. To provide assistance in programming the thermostat or to educate the building occupant of the benefits of having one installed and programmed, among other motivations, the various utility providers, energy regulators, and government agencies would benefit in targeting the effort to premises where the thermostat is not programmed. Such information may be ascertained by asking the homeowner or by having a service person survey the premises. Alternatively, the programmable thermostat may be configured to communicate such information. As such, there is a cost associated in getting this information; the value of which may not warrant the additional cost in its retrieval.

The illustrative embodiments determine the status of a programmed thermostat being employed at a premises using readily available energy usage data, such as from a communicating meter installed at the premises. As such, the embodiments may be employed without additional hardware having to be installed at the premises and without engagement with the building occupant. The embodiments may be performed remotely of the premises and may be performed in an on-going basis to ensure that the entitled benefit of a programmed thermostat is continually realized.

Moreover, the various embodiments may provide an objective metric to determine such information. As such, rather than merely determining whether a programmed thermostat is at the home, the various embodiments may determine if the thermostat is also properly programmed.

FIG. 1A is a flowchart illustrating a computer-implemented method according to an illustrative embodiment. The computer-implemented method may be employed to reduce energy usage by a building occupant by providing tailored consumer information thereto. FIG. 1 is described along with FIG. 10A, which is a schematic block diagram of a system 200 that may utilize the various embodiments. The computer system 1002 (shown as "server 1002") may receive the energy usage data 1004 of premises 1008a, 1008b, and 1008c (see FIG. 10A) associated to consumers (step 102). Each premises may have a controller 1010 (see, for example, FIG. 10C), such as a thermostat, to regulate the temperature in a controlled space within the premises 1008a-1008c. As such, the energy usage data 1004 is associated, in part, to the regulation of the controller 1010 while other portions may be attributed to other electrical loads 1011 at the premises 1008a-1008c. The controller 1010 may regulate a climate control system at the premises, such as a HVAC system 1009 (see FIG. 10C).

The energy usage data 1004 may include readings from a meter 1013 (see FIG. 10C) that span a portion of a billing cycle or several thereof. The data may be in various increments, such as one-half hour, one-quarter of an hour, or minute data that may vary within the data. The usage data may be considered as a time series dataset.

Figure 1B:
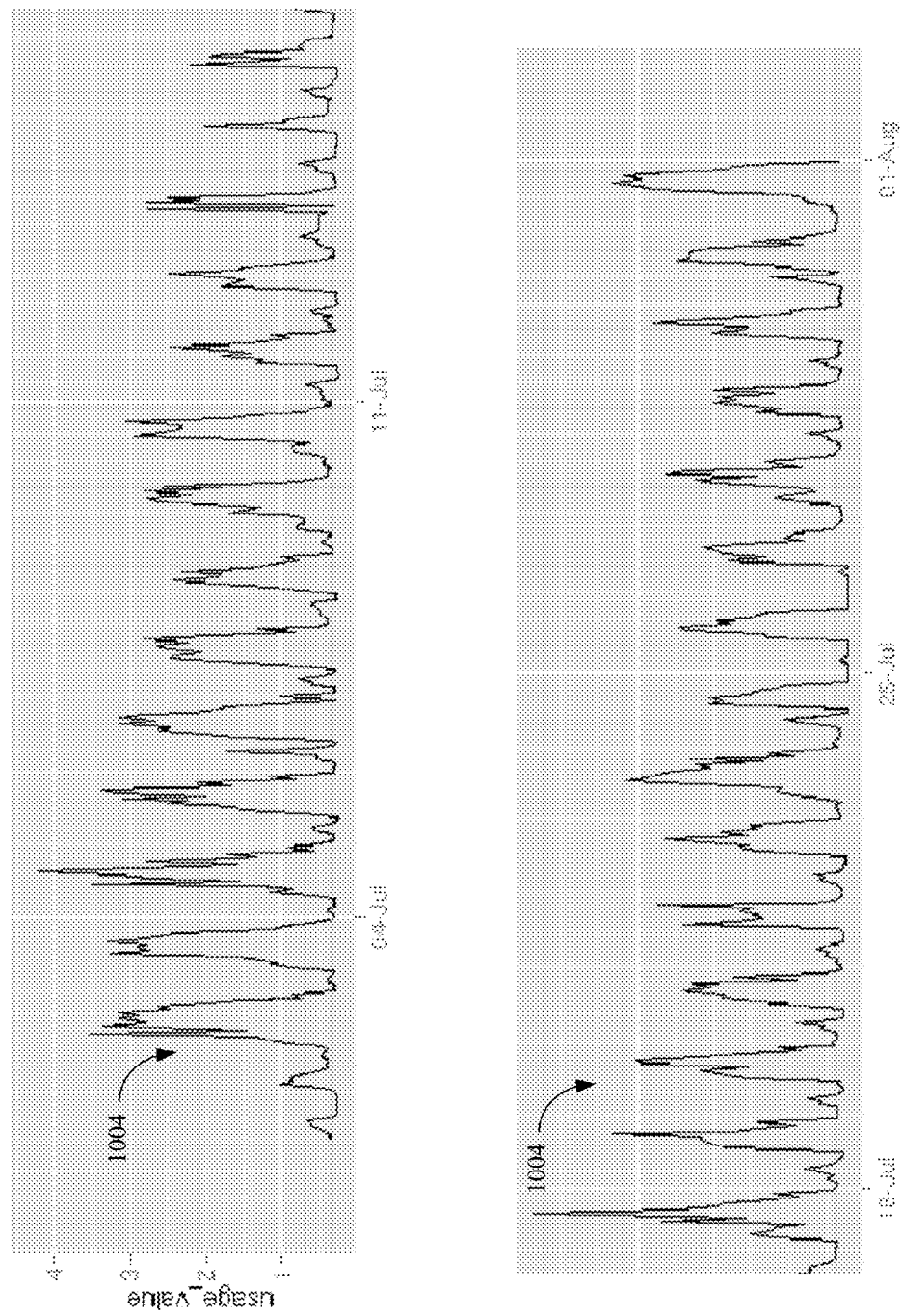
FIG. 1B is a plot illustrating energy usage data for a single premises over a single month.

FIG. 1B is a plot illustrating energy usage data 1004 for a single premises over a single month. Here, the data 1004 is for July in a summer season. The first (upper) portion of the figure shows the first fifteen days in the month and second (lower) portion shows the remaining days in the month.

Figure 1C:
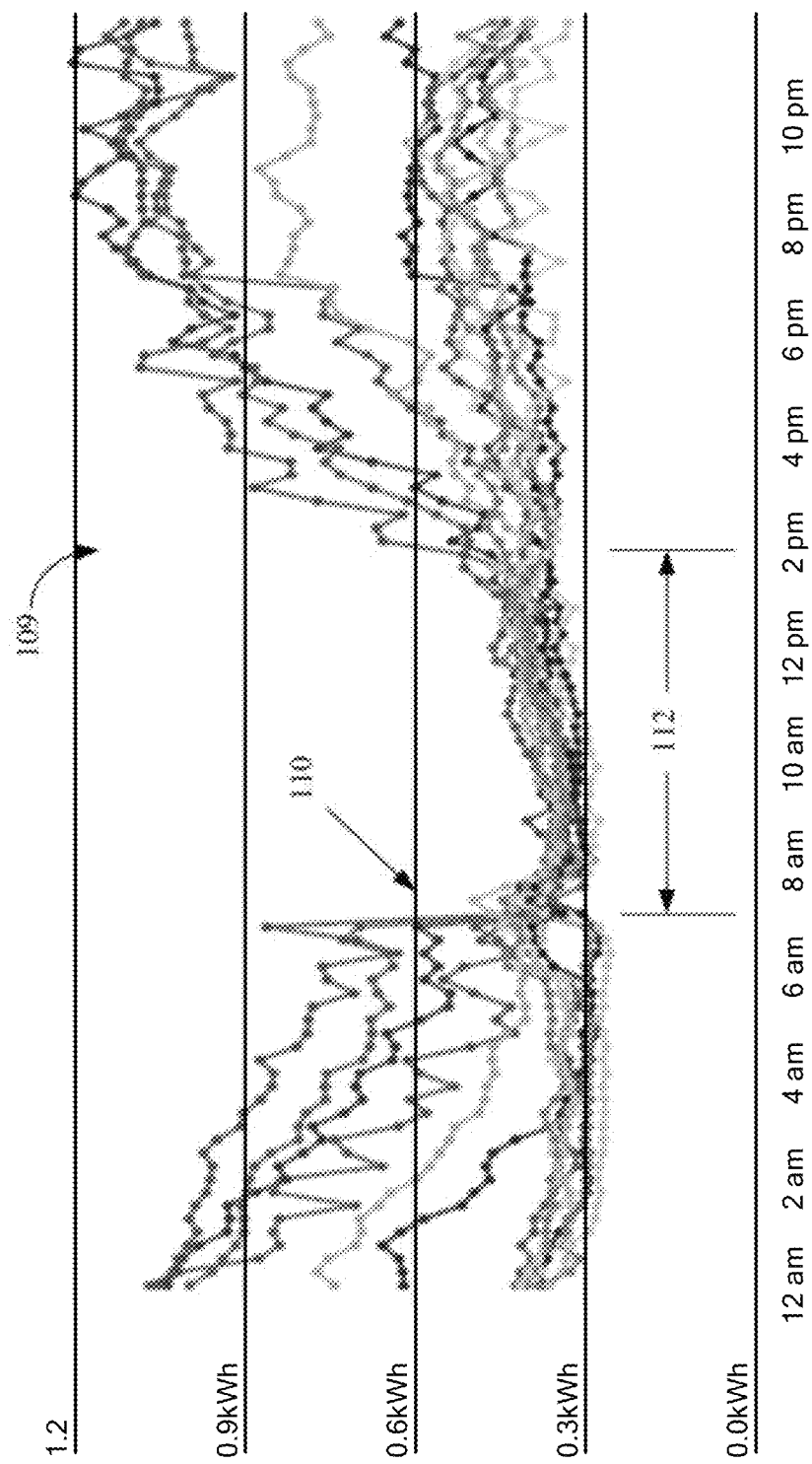
FIG. 1C is a diagram summarily illustrating energy usage data of a premises having a programmed thermostat.

Referring back to FIG. 1A, the computer system 1002 may determine a status of whether the controller 1010 adjusts the temperature according to a time-of-day dependent setting using the received energy usage data 1004 (step 104). FIG. 1C is a diagram summarily illustrating energy usage data 109 of a premises having a programmed thermostat. Specifically, the figure shows averaged energy-usage data 110 of the premises, averaged for each month in the year and shown in hourly increments over the course of a day. In this figure, it is observed that generally between the time periods 112 of 7 A.M. and 2 P.M., the usage is significantly reduced due to program settings of a programmable thermostat. The reduction occurs with the same or similar pattern at generally the same time of the day.

Although this pattern may be readily apparent to a skilled person viewing this data, the pattern may not be readily apparent to a machine. For example, variability in the usage data may result due to a number of conditions that the premises is subjected to, including for example: the season, the weather, a change in the number of occupants, the occupant preferences and change of habits, and the day of the week. As such, although two households may have similar patterns with differing magnitudes—one may have a programmed thermostat and the other may not. Moreover, the degree of variability may produce patterns having weak correlations between the usage data (including cost) and the customer's behavior. Thus, it is generally expected that a high degree of training may be necessary to accurately evaluate each data set.

Figure 3A:
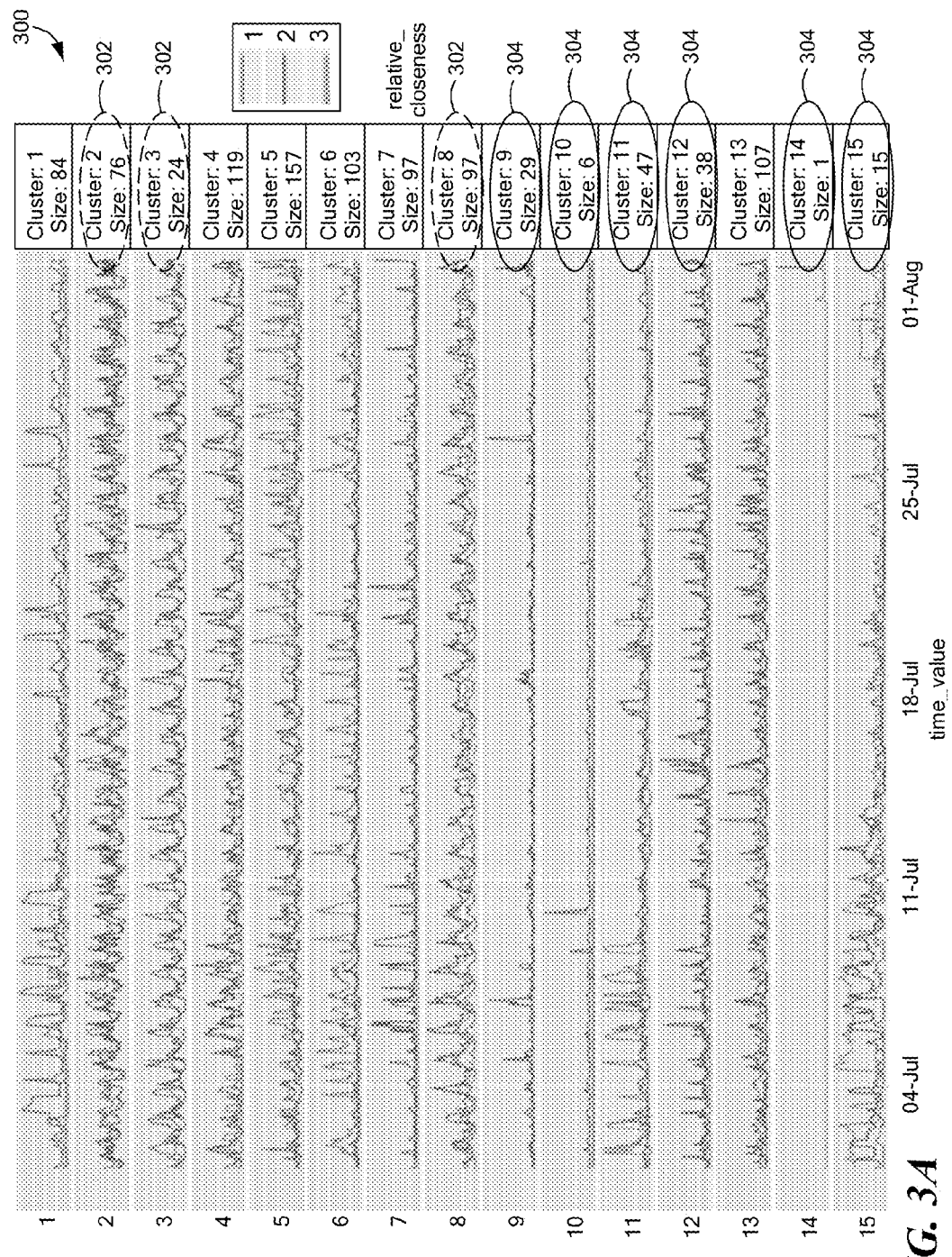
FIG. 3A shows an exemplary plot of clustering using a K-means approach according to an illustrative embodiment.

Energy usage data 1004 of premises with a programmed thermostat or an unprogrammed thermostat is also shown in FIG. 3A. Here, elements 302 are representative energy usage data of premises selected from a set of energy usage data known to have programmed and unprogrammed thermostat premises during a summer season in July. The elements 302 are clustered using K-means classification, and each of the elements 302 shows energy usage data having similar "nearest means" to other energy usage data within the set of data. Elements 304 are representative energy usage data of premises selected from the same set of energy usage data. Rather than energy usage data of premises with a programmed thermostat, elements 304 are representative of premises without a programmed thermostat. The remaining clusters illustrate a state in which it is unclear whether the premises have a programmed thermostat or that the thermostat is unprogrammed.

Evaluating the energy usage data may be further made difficult by the large set of customers. A typical commodity providers or utility company may provide services to a large number of customers for a given geographic location.

Upon a status of a programmed thermostat or an unprogrammed thermostat being present at a premises, tailored information may be provided for the respective premises (step 106—see FIG. 1A). In an embodiment, commodity providers, utility companies, or government agencies may use the observable conditions for energy efficiency, demand response or conservation directed campaigns and/or services. Generally, energy efficiency campaigns are performed in a blanket fashion, in which literature is sent to all active customers based solely upon geographic location. This is generally a costly and wasteful proposition since the literature may be relevant to only a subset of the customers or only portions of literature may be relevant. By being able to determine relevant subset of customers (based upon a statistical threshold), the campaign may advantageously be tailored to target subsets of the customers, thereby reducing its cost and scope.

In another embodiment, the various programs described above may provide more suitable information to each customer by varying or tailoring messages based upon the amount and level of information that is provided for each building occupant. For example, rather than a single literature that is distributed to all customers, different literature may now be prepared based upon customers' acceptance, understanding, and attitude.

In one scenario, customers are classified in to three groups: (I) customers operating programmed thermostat on the premises, (II) customers that have installed, but not programmed their programmable thermostat, and (III) customers that do not have programmable thermostats.

Different actions may then be taken for each of these groups to improve the persuasiveness of the message. For Group I customers, only information to help optimize the programming of the thermostat may be sent. The literature may merely indicate the amount of savings the customers have realized and a tailored estimate of potential savings from slight adjustments to their thermostat settings. Information about the benefit of owning a programmable thermostat may be omitted. For Group II customers, instructions on thermostat programming may be sent in addition to or in lieu of the literature on savings. For Group III customers, literature on potential savings of programmable thermostats ownership may be provided.

The tailored information may be generated as part of a home energy report, which may be part of a bill, sent to the consumer. The report may be part of an efficiency or conservation campaign and may be used to determine the material to be sent to the consumer. The home energy report may be printed literature. It may be electronic document sent via email or made available via a web portal. The web portal may include interactive content, which may be provided via smart devices that are located within the premises, for example, a smart thermostat.

Energy usage data 1004 may include data from an electric or gas meter. The usage may be characterized, for example, in units of kilo-watts (kWh) or British thermal units (BTU). Energy usage data 1004 may be acquired from AMI meter, smart meters, as well as various usage sensing device that may be deployed on the premises, for example, smart thermostats, or energy management systems. Energy usage data 1004 may further be acquired from a utility database as used for billing purposes or a database managed by a service provider. It should be appreciated that the various benefits discussed may be employed singularly or in combination for each respective stakeholder, such as the homeowners, the commodity providers, the utility companies, and government agencies.

Figure 2A:
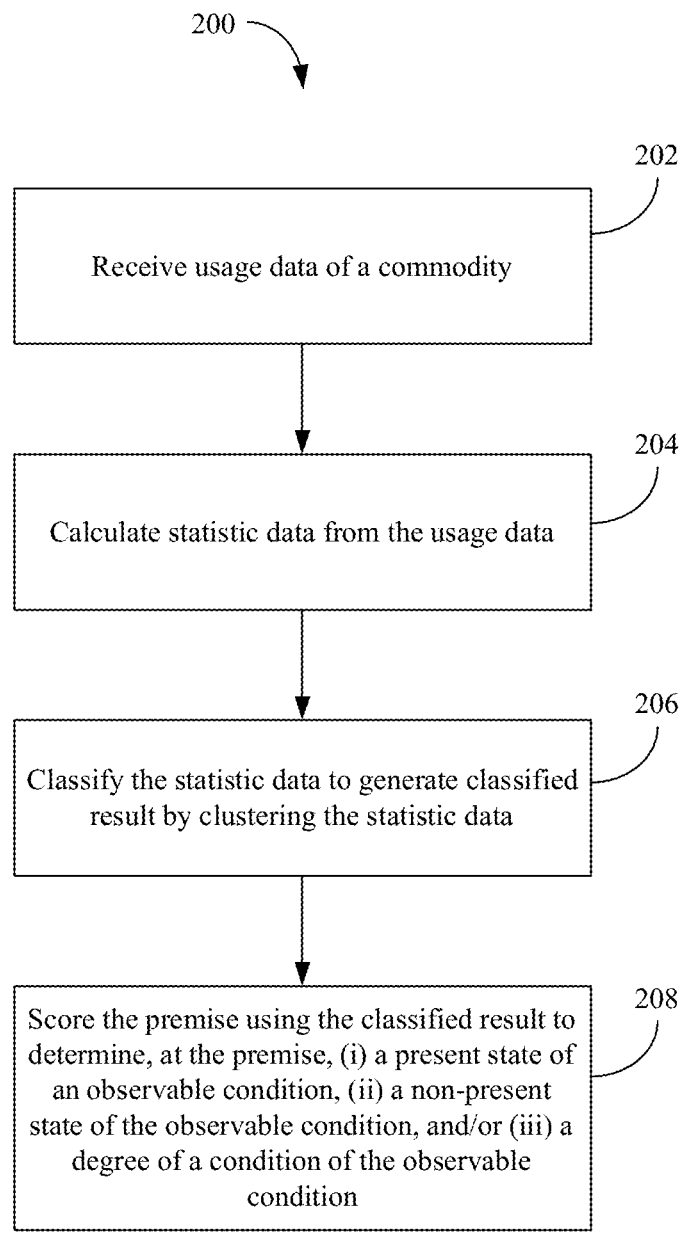
FIG. 2A is a schematic flowchart illustrating an operation of determining a status of a premises using clustering according to an illustrative embodiment.
Figure 2B:
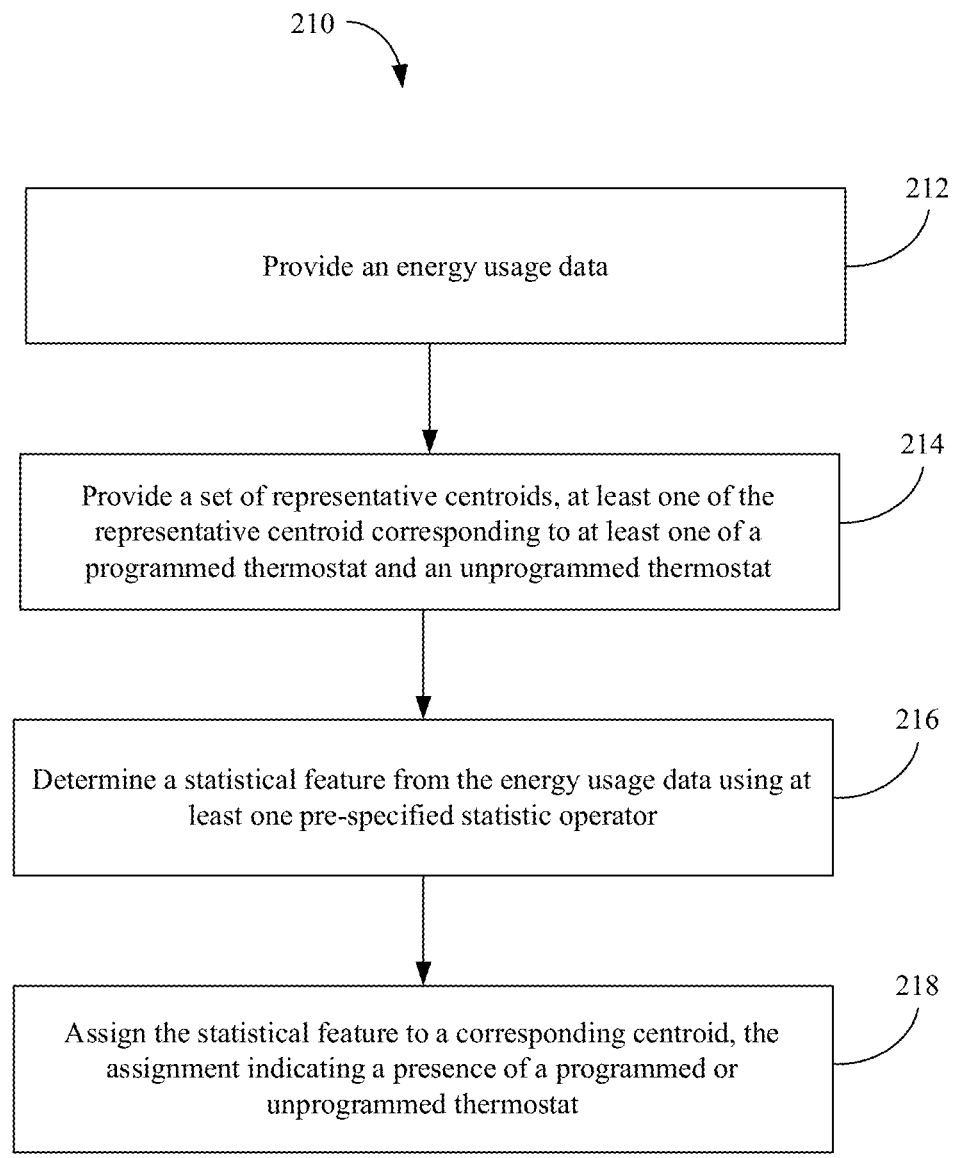
FIG. 2B is a schematic flowchart illustrating an operation of determining a status of a premises using clustering according to another illustrative embodiment.
Figure 7:
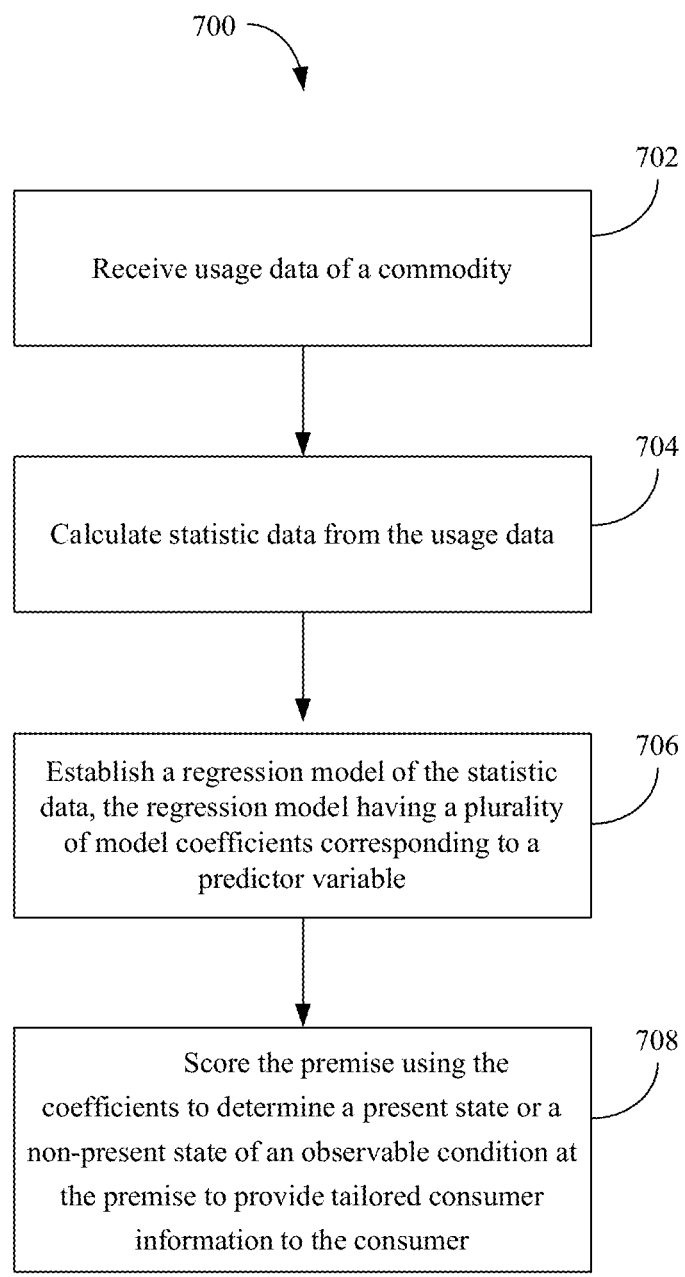
FIG. 7 is a schematic flowchart illustrating an operation of determining a status of a premises using regression models according to an illustrative embodiment.
Figure 9:
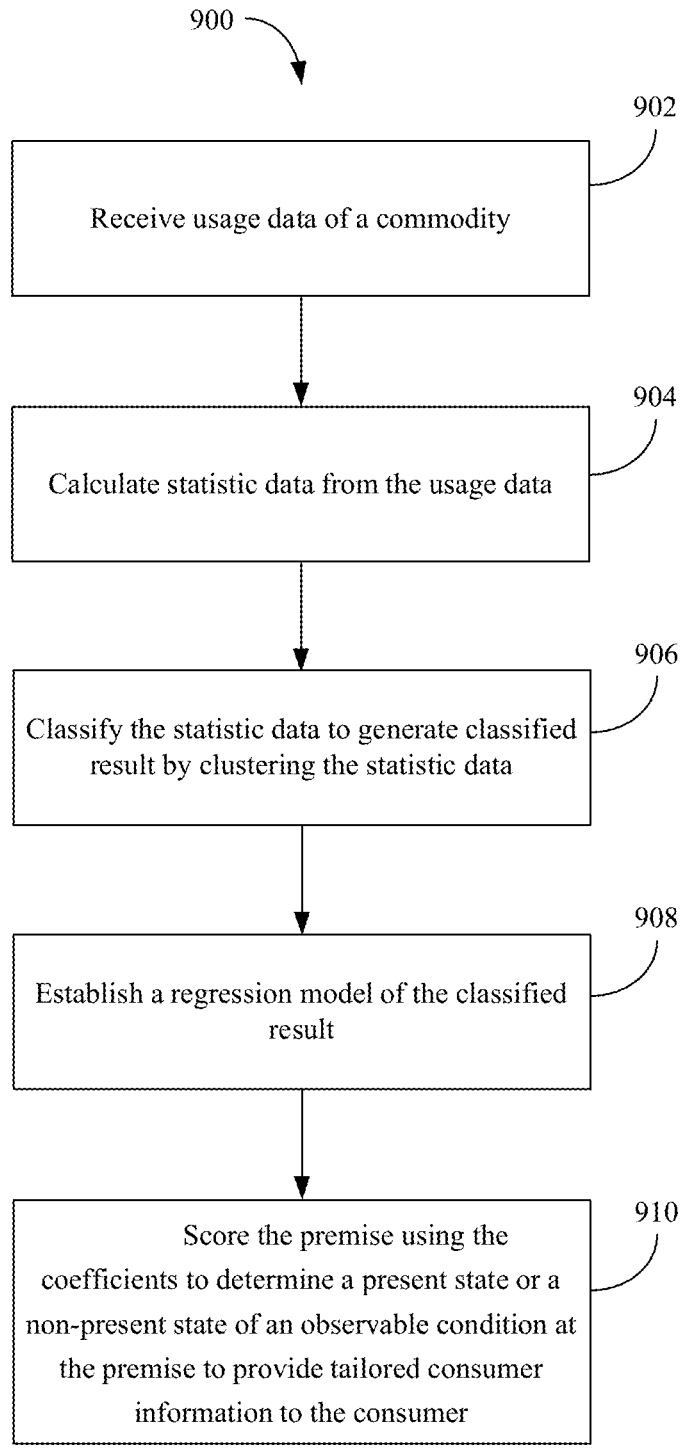
FIG. 9 is a diagram of a computer-implemented method of determining a status of a premises using a combination of clustering and regression models according to another illustrative embodiment.

A number of approaches may be employed according to the various illustrative and alternate embodiments to determine the status of the premises. FIGS. 2A-2B, 7, and 9 are flowcharts illustrating various computer-implemented method according to various illustrative embodiments to determine the status of the whether the controller adjusts the temperature according to a time-of-day dependent setting (i.e., the programmable thermostat is programmed or unprogrammed). Specifically, FIGS. 2A-2B illustrate clustering approaches. FIG. 7 illustrates a model-based approach. FIG. 9 illustrates a hybrid approach using modeling and clustering.

Clustering and Classification Approach

FIG. 2A is a schematic flowchart illustrating operations of a computer-implemented method 200 of determining the status of a premises using clustering according to an illustrative embodiment. The computer system 1002 may receive energy usage data associated to the premises (step 202) and calculate, from the usage data, a number of statistical data or features (step 204). These statistical features may include derived statistical summary related to at least one of seasonality, trend, decomposed data, kurtosis, skewness, serial correlation, non-linear autocorrelation, long range dependence, and chaos. Of course other statistical features may be calculated. The determination of various statistical data or feature measures are known in the art and is described, for example, in Wang et al., *Rule induction for forecasting method selection: meta-learning the characteristics of univariate time series,* 72 NEUROCOMPUING 2581-2594 (2009), the entire contents of which are incorporated by referenced herein.

Specifically, seasonality refers to the presence of a seasonal component (i.e. periodic pattern) in the time-series that are influenced by seasonal factors. A seasonality window may be used to determine seasonal component on a daily basis, a weekly basis, or a yearly basis. Seasonality may also be determined by identifying a large autocorrelation coefficient from the usage data or by identifying a large partial autocorrelation coefficient at the seasonal lag.

Trend refers to the presence of a long-term change in the mean level of the time-series. Trend may be determined, for example, using a smooth nonparametric regression function, such as penalized regression spline.

Decomposed data refers to data with the seasonal and trend components removed and may include weekly and yearly seasonality components. Multiple-seasonal decompositions, for example, may be utilized to iteratively remove marginal seasonality. Alternatively, a regression at the present time, at time approximately one day ago, at time approximately one week ago, and at time approximately one year ago may be utilized to remove seasonal trends.

Kurtosis refers to the measure of peaked-ness. It may be expressed as a probability distribution of the distribution function. It may be considered a descriptor of the shape of the function.

Skewness refers to the measure of asymmetry of the distribution.

Serial correlation (or autocorrelation) refers to the relationship between a given variable and itself over various time intervals. The correlation value is determined between the usage data at current time t and past times $t-1$, $t-2$, $t-3$, etc.

Non-linear autocorrelation refers to whether usage at current time, t, non-linearly depends on past usage, for example, at time $t-1$. Non-linear autocorrelation may be determined using a nonparametric kernel test or a neural network test.

Long range dependence refers to the measure of extent to which high usage in time t is predictive of high usage at time $t+1$, $t+2$, $t+3$, etc. Long range dependence may be calculated, for example, using the Hurst exponent as described in O. Rose, *Estimation of the Hurst Parameter of Long-Range Dependent Time Series,* Research Report, 137 (1996).

Chaos refers to a behavior of the dynamical systems as measured by the Lyapunov exponent. Lyapunov exponent is a quantity that characterizes the rate of separation of infinitesimally close trajectories over time (i.e., a measure of chaos). The Lyapunov exponent may be estimated using time series with parameters m (embedding dimension), d (time delay), k (number of considered neighbors), eps (radius of neighbors), s (iterations to follow neighbors at each point), ref (number of points), and t (Theiler window). The operation may be performed, for example, by R-software to analyze non-linear time series. The calculations may be based, for example, upon J.-P. Eckmann and D. Ruelle, *Ergodic theory of chaos and strange attractors*, 57 REV. MOD. PHYS. 617 (1985) and R. Stoop and J. Parisi, *Calculation of Lyapunov exponents avoiding spurious elements*, 50 PHYSICA D 89 (1991), which are both incorporated herein in their entirety.

Figure 12:
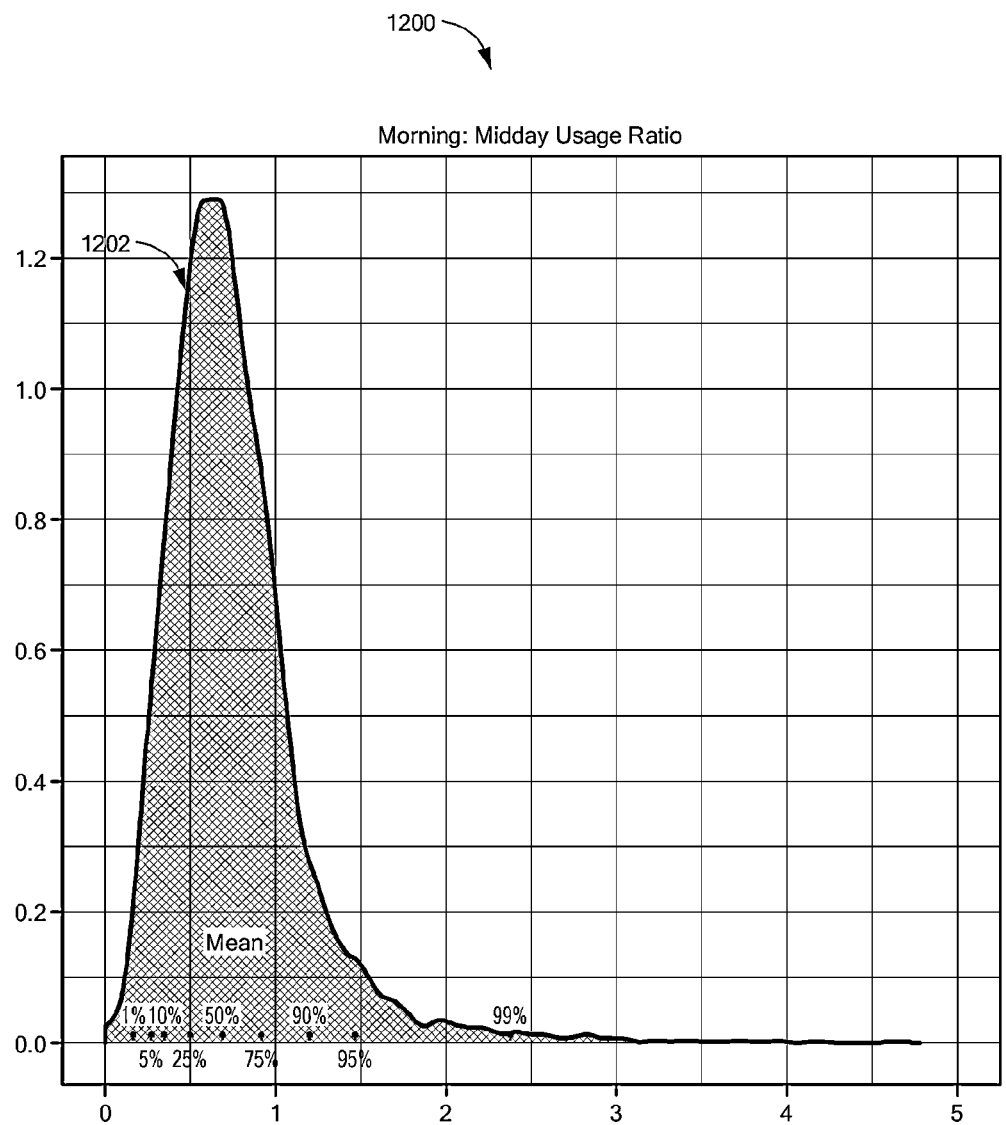
FIG. 12 shows a plot of measured daily-range ratio of active portions of the day according to an illustrative embodiment.

Alternatively, statistical data may also be calculated by determining the average, mean, mode, and variance of the time series (i.e., hourly) usage data of each customer. Summary statistical data may also include a measure of a daily-range ratio between active portions of the day, including, for example, morning to mid-day usages. An example of such a ratio 1202 is shown as plot 1200 in FIG. 12.

Referring back to FIG. 2A, the computer system 1002 may classify the statistical data to generate classified result data by clustering the statistical data (step 206). Clustering generally entails comparing individual observation qualities to determine patterns in a resulting "clusters" or "buckets". The observations may be treated before the clustering, such as by averaging or filtering.

Alternatively, clustering may be performed on summary statistical data of the customer's historical usage. The computer system 1002 may reduce the dimensionality of the energy usage data by calculating the summary statistical data, and then executing clustering algorithms on the resulting low-dimensional observations.

Clustering may be performed based upon a number of methods, including k-means, hierarchical clustering, Kohonen self-organizing maps, and/or other neural networks. Several methods are now described in greater detail. For example, FIG. 3A shows an exemplary plot 300 of clustering using a K-means approach according the illustrative embodiment. This approach partitions n observations into k clusters in which each observation belongs to the cluster with the nearest mean. In the example shown, fifteen (15) K-means results (K=15) were run ten times on representative service points of real energy usage data, from premises that either have or not have programmed thermostats. The rows show clusters 1 to 15 having a sample size of 84, 76, 24, 119, 157, 103, 97, 97, 29, 6, 47, 38, 107, 1, and 15, respectively within the set of energy usage data. The best fits of the usage data were selected and shown within the fifteen clusters, which shows a state in which a building has a programmed thermostat (elements 302), a state in which it does not (elements 304), and a state of "can't tell" as the remainders. Specifically, the elements 302 annotate clusters of premises having programmed thermostat and the elements 304 annotate clusters of premises having unprogrammed thermostat. The figure shows the energy usage values in the y-axis as an hourly time series along the x-axis.

Figure 3C:
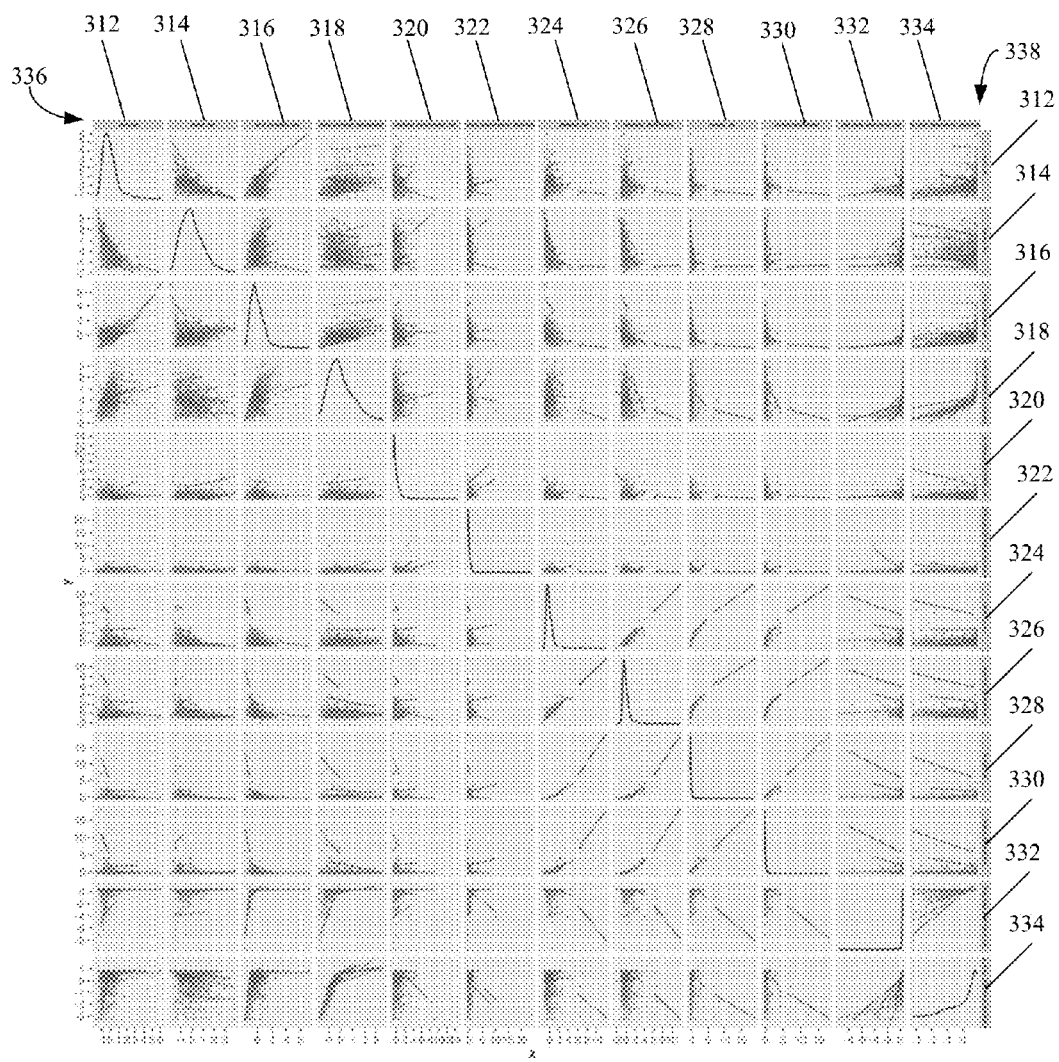

In addition to being performed on raw data, the analysis may be performed on decomposed summary data. FIGS. 3B-A, 3B-B, and 3B-C show plots 310 of spatial distribution of the raw and decomposed summary statistical data employing a number of clustering methods according to the illustrative embodiment. Specifically, the figure shows distribution (including the mean and variance) of various statistical features derived from the set of energy usage data used to generate the clusters in FIG. 3A. In the figure, the X-axis labels the cluster number as shown in FIGS. 3B-A, 3B-B, and 3B-C. A distributions 310 are shown for the raw summary data of the clustering methods based on the trend 312, the seasonality 314, the serial correlation 316, the non-linear autocorrelation 320, the skewness 324, the kurtosis 328, and the long-range dependence 332. The figures further show the distribution of decomposed summary statistical data of the clustering methods based on the serial correlation 318, the non-linear autocorrelation 322, the skewness 326, the kurtosis 330, and the long-range dependence 334. From FIGS. 3B-A, 3B-B, and 3B-C, it is observed that premises having programmed thermostats have a high degree of seasonality. Specifically, plot 314 of FIG. 3B-A shows clusters 2, 3, and 8 (see arrow 336) of FIG. 3A having a high value of distribution. Thus, seasonality may be a good predictor of whether the premises have or not have a programmed thermostat. Such analysis may be similarly made to energy usage data from various other geographic regions and other statistical features to determine predictors of the programmed/unprogrammed state of the premises.

FIG. 3C shows an exemplary plot of paired raw and decomposed summary statistical data using the clustering methods of FIG. 3A according to the illustrative embodiment. Specifically, the figure shows the raw summary data based upon clustering using the trend 312, the raw season 314, the serial correlation 316, the non-linear autocorrelation 320, the skewness 324, the kurtosis 328, and the long-range dependence 332. The figure further shows decomposed summary statistical data based upon clustering using serial correlation 318, non-linear autocorrelation 322, skewness 326, kurtosis 330, and long range dependence 334. For each plot in FIG. 3C, the x-axis corresponds to the features 312-334 of row 336, and the y-axis corresponds to the features 312-334 of row 338. The different clusters in each of the plots in FIG. 3 correspond to the fifteen clusters of FIG. 3A.

The pairing of the statistical data allow observations of i) the distribution of the features across the set of energy usage data population and ii) the correlation among any of the statistical features. Two observations may be made from the provided data set. First, the components are not very highly correlated, which means that the information are not duplicative. Put plainly, this means that models that operate well on non-correlated data are better suited. Second, the chart also indicates that there are outliers in many of the input variables. For example, features 322, 324, 330, 332, and 334 all show very long tails in the distributions (shown in the diagonals). Processing to remove the outliers or to minimize their impact to the model may thus be employed to improve the accuracy of the clustering.

According to another embodiment, hierarchical clustering may beneficial to be employed to build a hierarchy of clusters from the summary statistical data. This method of clustering provides for a natural and arbitrary tree of the usage data.

According to another embodiment, self-organizing maps may be employed to determine a status of the premises (step 104). FIGS. 4A-4C and 4E-4G show plot-results of Kohonen unsupervised self-organizing maps (SOM). The SOM find a set of centroids (i.e., a reference or codebook vector) by placing all similar AMI signals "near" one another and assigning each object in the data set to the centroid that provides the best approximation of that object (also referred to a "class"). Alternatively, supervised self-organizing maps may be used. FIGS. 5A-5C and 5E-5H show plot-results of Kohonen supervised self-organizing maps. In the maps, an energy usage data measured at a service point of a given premises is classified, by an operator, as being 'programmed', 'unprogrammed', and 'can't tell' (see , FIG. 5B). The supervised approach utilizes training data to place similar AMI signals closer to one another based upon the classified observed behavior. The training data may include distance metric, statistical features, or raw energy usage data of premises having a programmed or unprogrammed thermostat.

Specifically, FIGS. 4A-4C and 4E-4G and 5A-5C and 5E-5H show plots for unsupervised self-organizing maps (FIGS. 4A-4C and 4E-4G4A-4G) and supervised self-organizing maps (FIGS. 5A-5C and 5E-5H5A-5H) generated using R-software package that employs methods described in Ron Wehrens and Lutgarde M. C. Buydens, Self- and super-organizing maps in R: The Kohonen package, Journal of Statistical Software, 21 (5):1-19, 10 2007. The centroids (referred also as a bucket) are the same among each set of the figures. As such FIGS. 4A-4C and 4E-4G 4A-4G show one set of centroid mapping and FIGS. 5A-5C and 5E-5H 5A-5H show another set.

In either types of self-organizing maps, the summary-statistical data are expressed in k-dimensions and are mapped onto a j-dimension neural network (here, a 2-dimensional in the example plots) that represents the "distance" between observations. From the j-dimension map, new observations may be classified as having the observable property (in this case, programmed thermostats). This process may be likened to k-means in multiple result-space dimensions. The observations may be made randomly during the mapping.

Figure 4A:
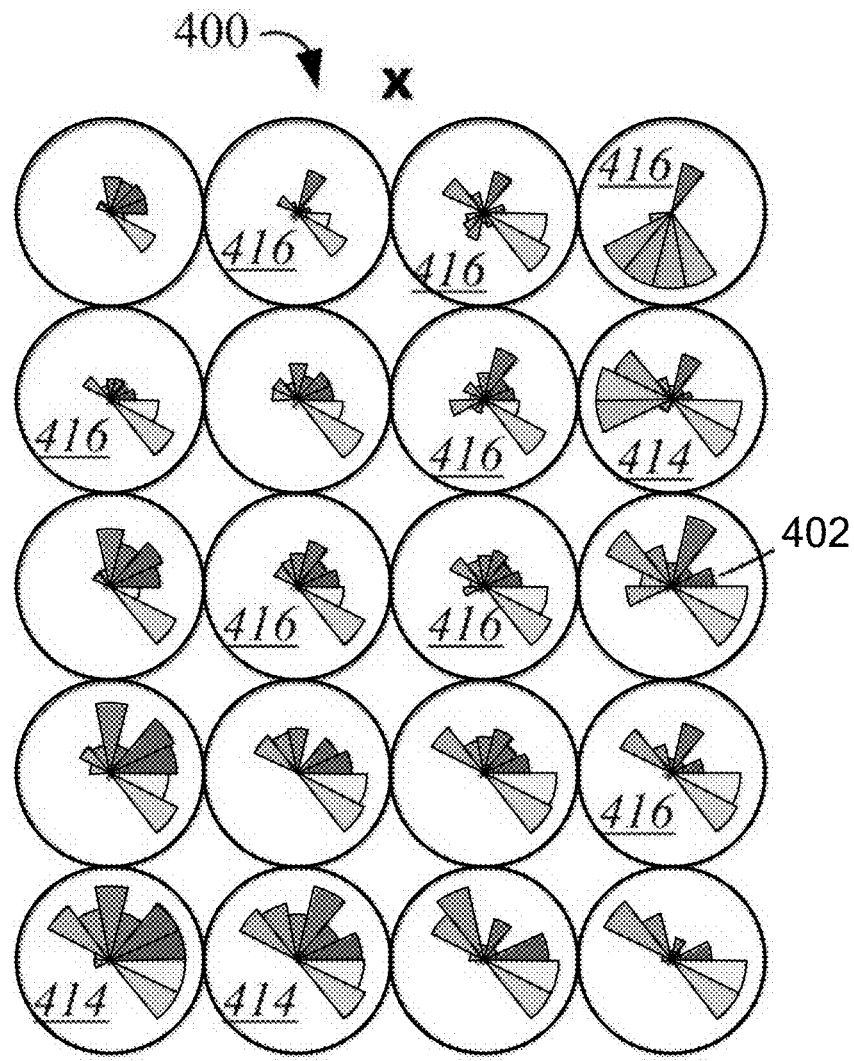
FIGS. 4A-4C and 4E-4G show plot results of Kohonen unsupervised self-organizing maps of statistical features derived from the energy usage data of FIGS. 3A, 3B-A, 3B-B, and 3B-C.
Figure 5A:
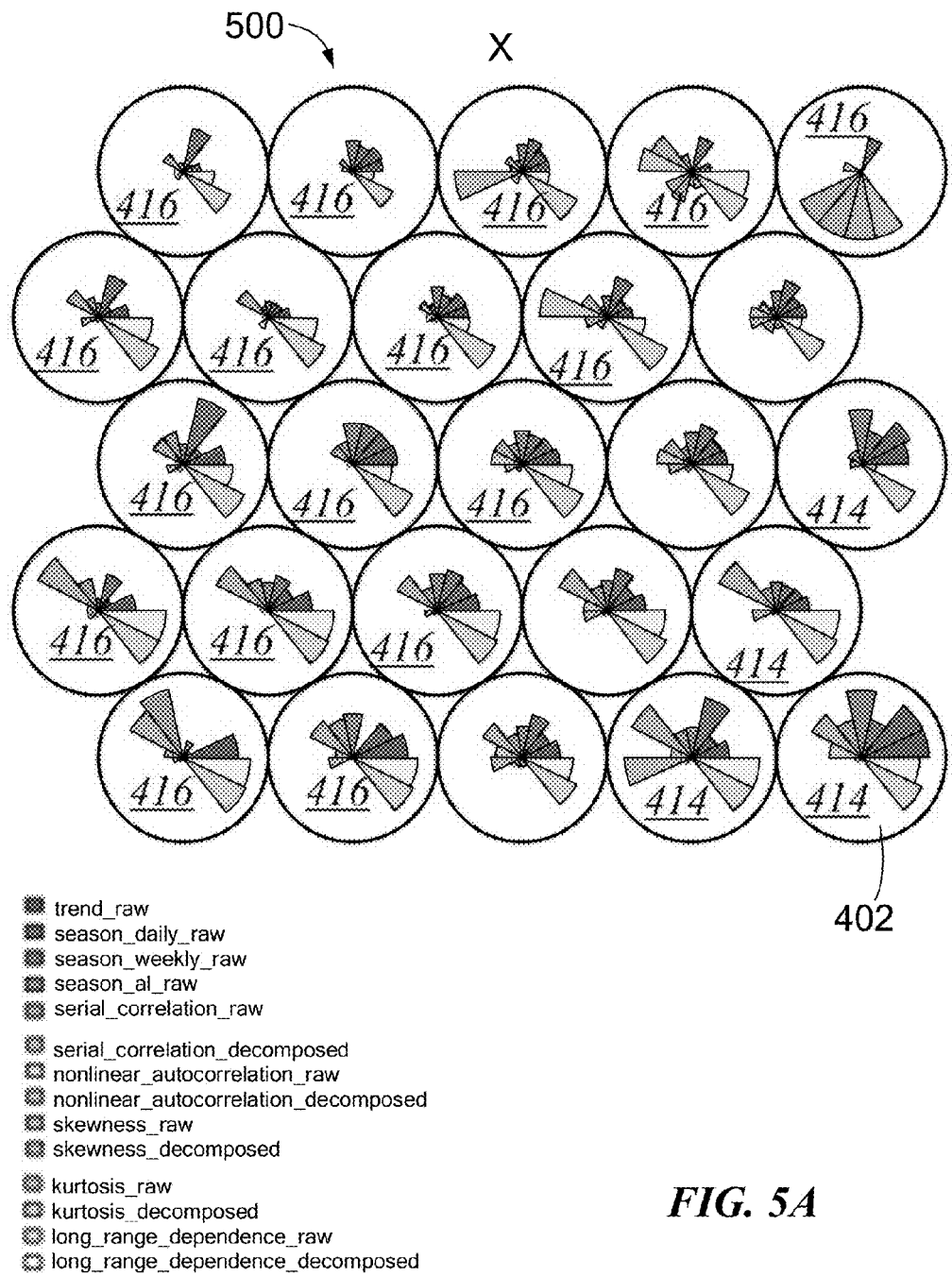
FIGS. 5A-5C and 5E-5H show plot results of Kohonen supervised self-organizing maps of the energy usage data of FIGS. 3A, 3B-A, 3B-B, and 3B-C.

Specifically, FIGS. 4A and 5A show the input objects 400, 500 for the self-organizing maps. The objects may include statistical features shown in FIGS. 3B-A, 3B-B, 3B-C, and 3C and are shown as segments where the length corresponds to the distance metric of the raw summary statistical data and decomposed summary statistical data. The segments are shown in the following order: trend (raw), season daily (raw), season weekly (raw), season all (raw), serial correlation (raw), serial correlation (decomposed), non-linear auto-correlation (raw), non-linear auto-correlation (decomposed), skewness (raw), skewness (decomposed), kurtosis (raw), kurtosis (decomposed), long-range dependence (raw), and long-range dependence (decomposed) starting at segments 402 and read counter-clockwise. As such, the objects may be shown as centroids corresponding to similarity of homes. Similarity may then be measured across features of trend, seasonality, serial correlation, non-linear autocorrelation, skewness, kurtosis, chaos, and long range dependence calculated on both raw and decomposed signals.

Figure 4B:
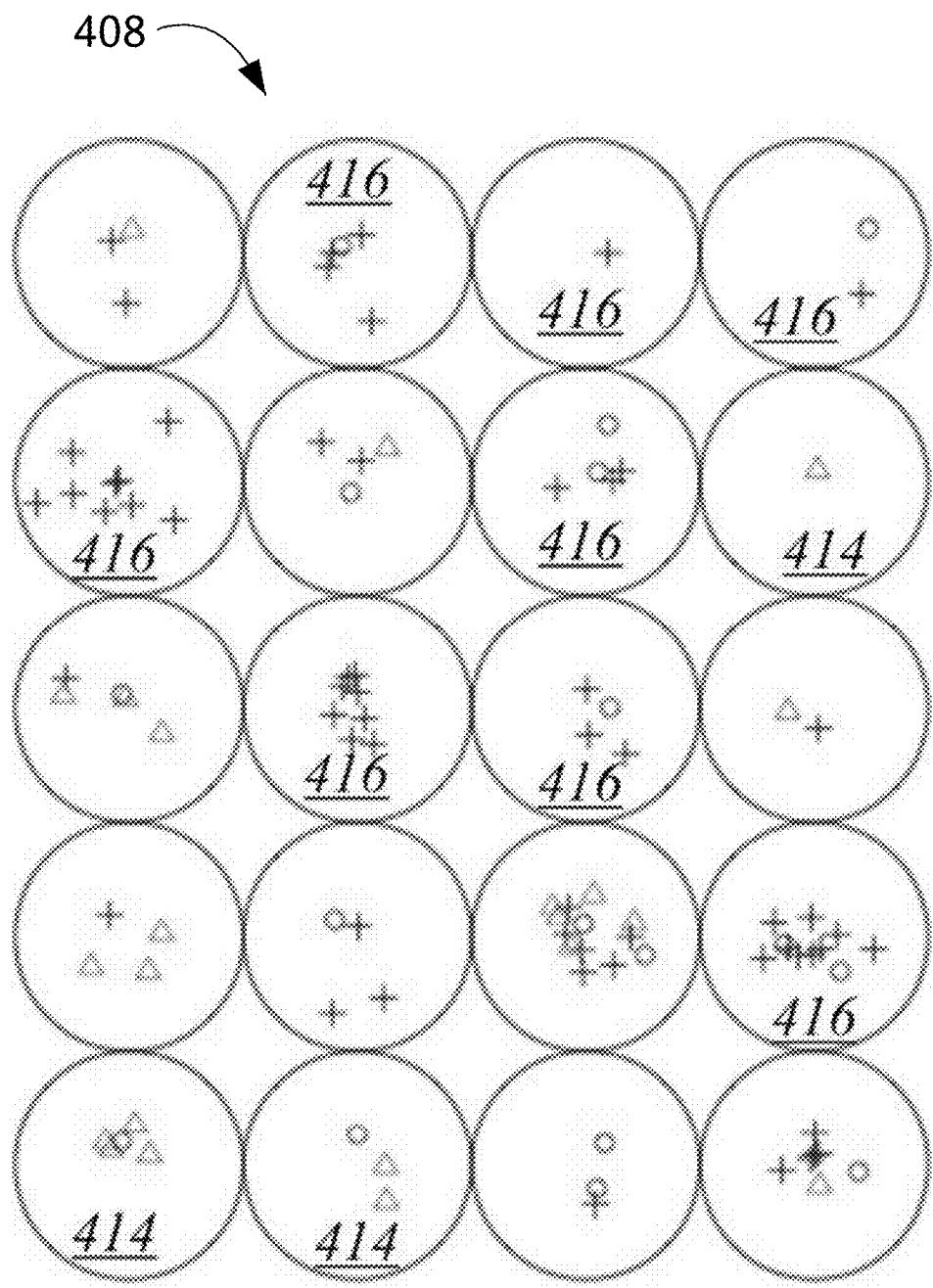
Figure 4C:
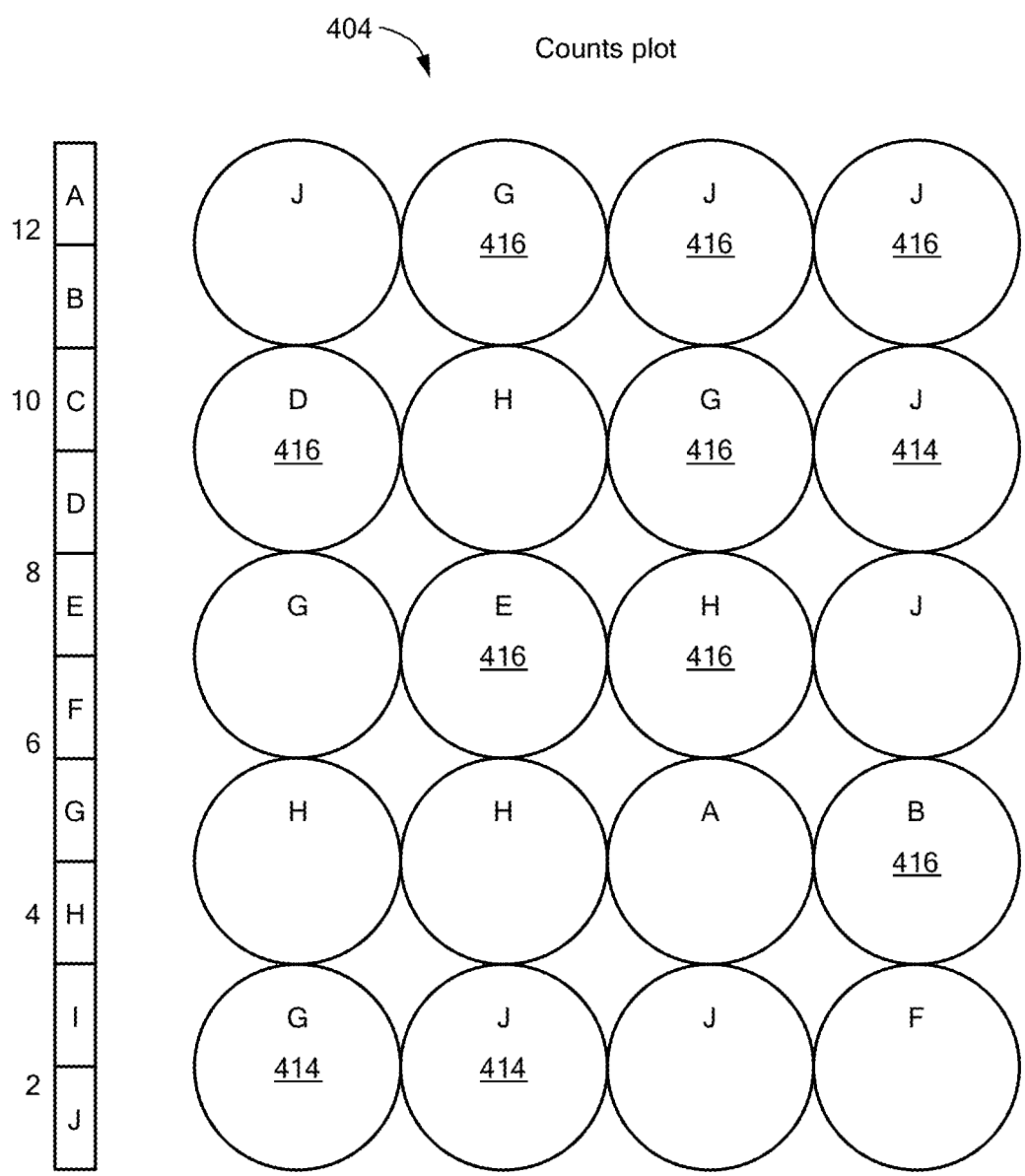
Figure 5B:
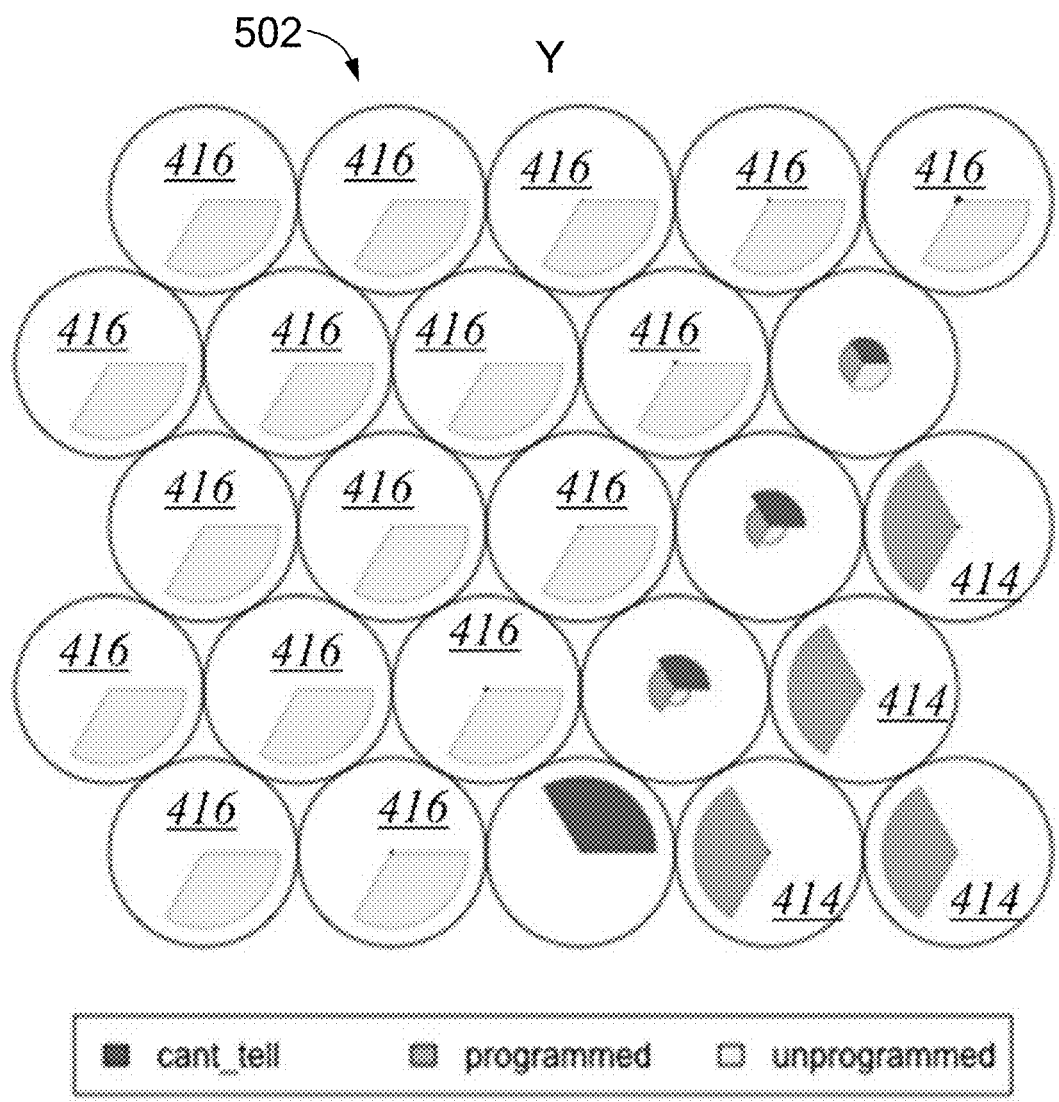
Figure 5C:
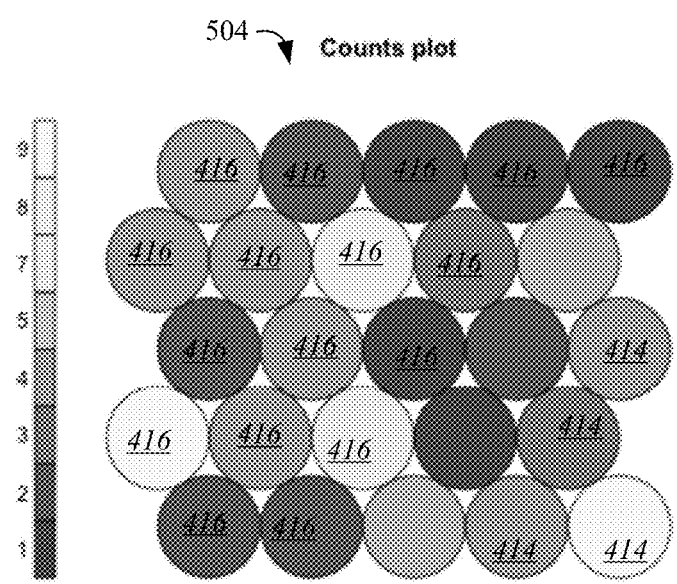
Figure 5E:
Figure 5F:
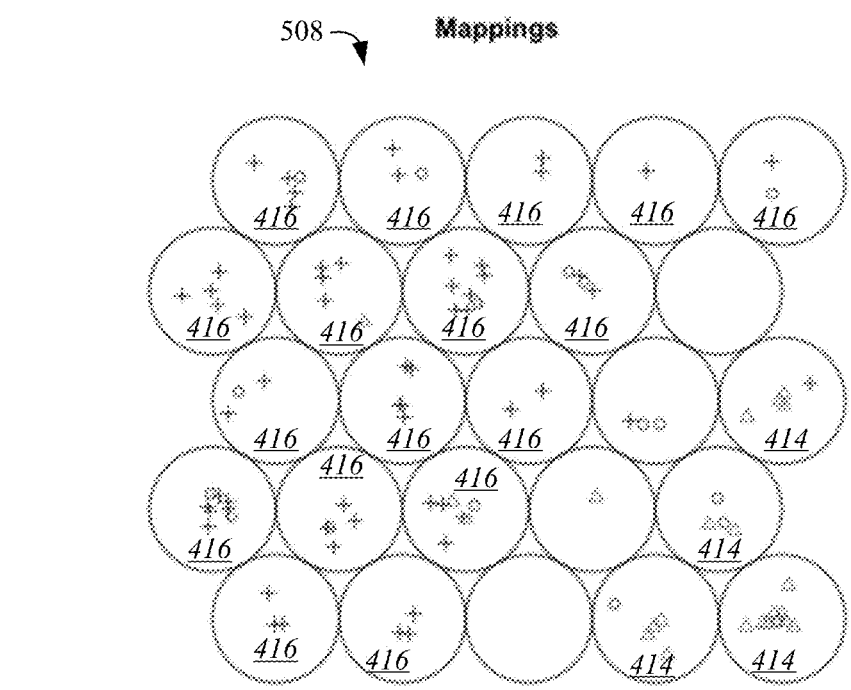

FIGS. 4B, and 5F show mapping plots 408 and 508, which show the spatial location of where the objects are mapped. The "unprogrammed", "programmed", or "can't tell" objects are shown as markers in plots 408, 508 (FIGS. 4B and 5F). As such, in each bucket, the status of given premises is shown. It is observed that the unsupervised self-organizing map can identify the status of a home in having a programmed thermostat or an unprogrammed thermostat. The labels 416 and 418 show clusters having a programmed thermostat (see labels 416) or an unprogrammed thermostat (see labels 418), which are shown in FIGS. 4A, 4B, 4C, 4G, 5A, 5B, 5C, 5F, and 5H.

Figure 4E:

FIGS. 4E and 5E show the energy usage data of premises classified to each centroid. As shown in FIG. 4C, buckets shown with labels 414 correspond to energy usage data of premises having a programmed thermostat and buckets shown with labels 416 correspond to data of unprogrammed thermostat (see also FIGS. 4A, 4B, 5A, 5B, and 5C). In FIG. 4E, the energy usage data of premises having a programmed thermostat is shown with labels 418 and of unprogrammed thermostat is shown with labels 420.

FIG. 5B shows the codebook vector 502 used for the training of the supervised self-organizing map.

FIGS. 4C and 5C show the count plots 404, 504, which indicate the number of objects mapped to the individual class units (i.e., each bucket or circle).

Figure 4F:
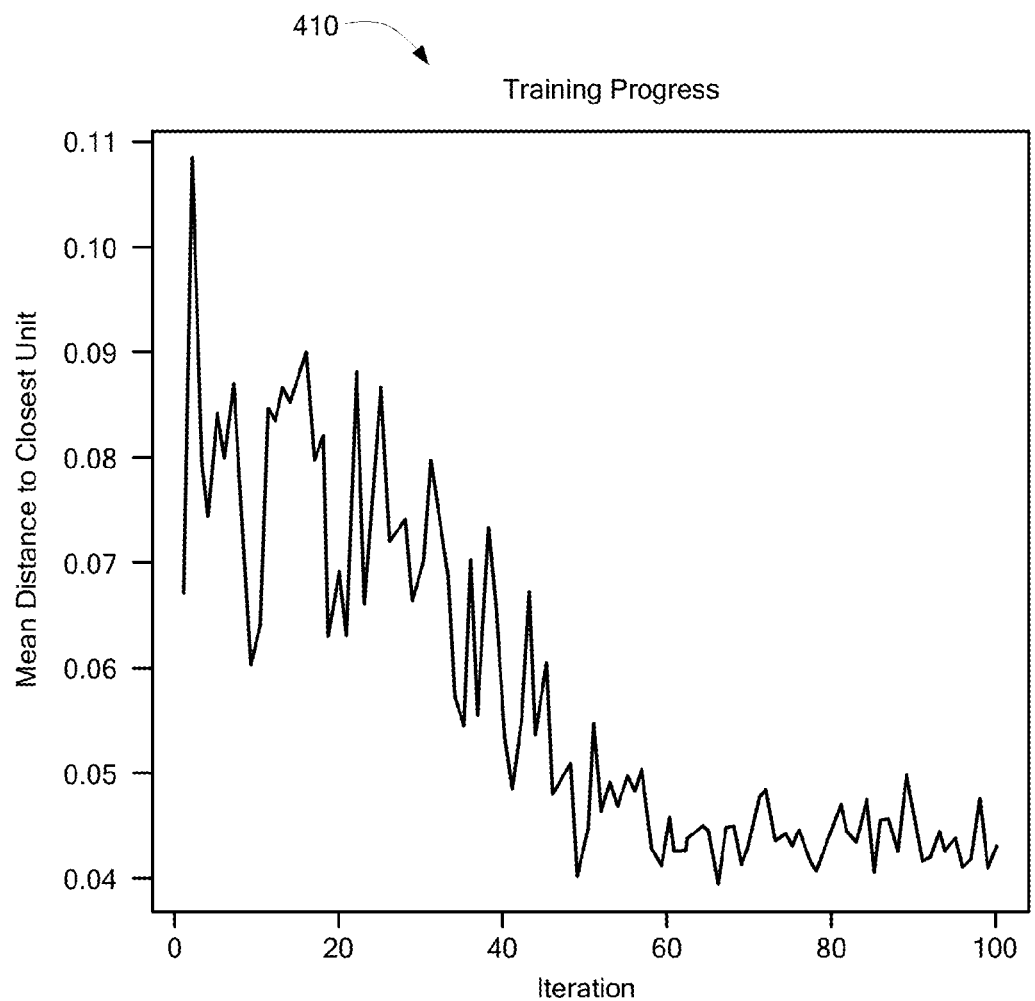
Figure 4G:
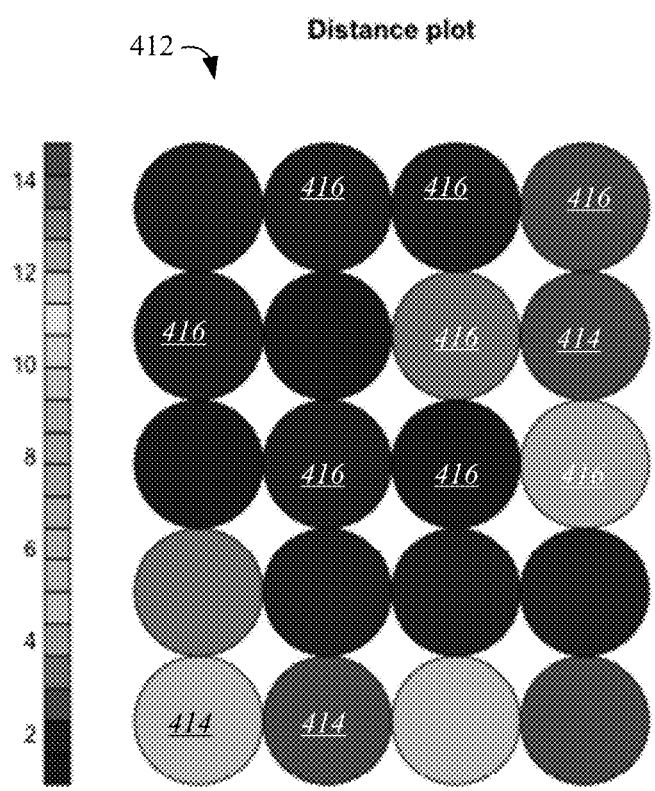
Figure 5G:
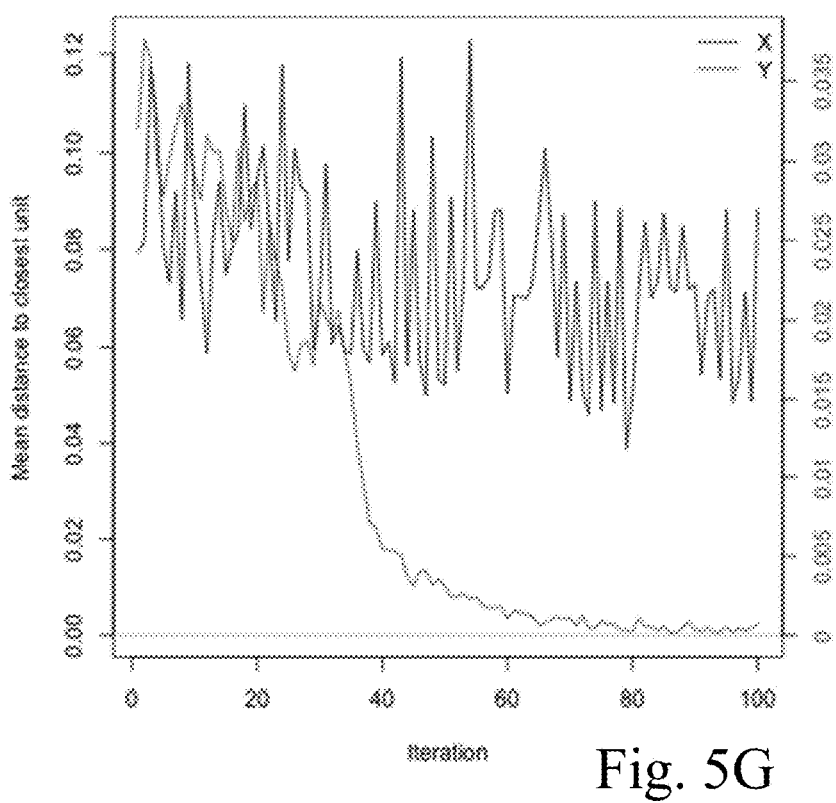
Figure 5H:
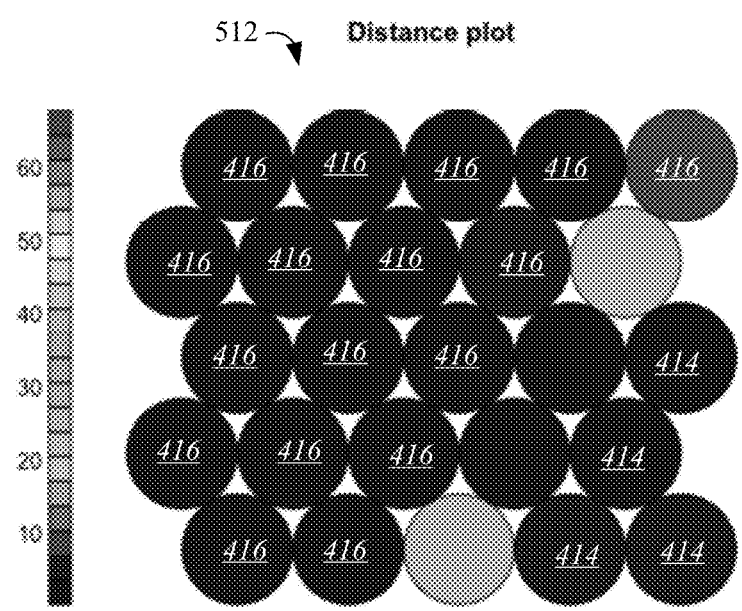

FIGS. 4F and 5G shows training plots 410, 510, which show the mean distance to the closest codebook vector for each of the iteration. Figures F4 and 5H show the distance plots 412, 512, which show the distances between the immediate neighbors.

According to various embodiments, filtering of outliers may be employed to improve the accuracy of the clustering. The computer-implemented method may filter non-relevant statistical data prior to clustering. For example, the method may filter partial or whole customer data from the training set. The system may focus on specific time periods (i.e. months) for a specific home, while also having the capacity to ignore certain data points within the same month in the same home because one or two outliers may make a pattern unobservable. For example, unusual weather, unusual usage in the home, or missing meter readings may distort the clustering. The filtering may ignore values rather than counting them as a zero.

In an embodiment, filtering may include calculating summary statistical measures such as kurtosis, skewness, among others. The method may then include identifying potential outliers using a common detection technique, such as, for example, Mahalanobis distance, Random Forests, t-tests, among others. The method may then include deleting the identified outlier records from the training set and run the filtered dataset through one of the training models, such as SOM, Kohonen clusters, among others. Alternatively, the method may include deleting the statistical features that are subject to outliers before classifying the records using a training model.

In an embodiment, subsequent to identifying potential outliers, the method may then include, for customers considered outliers, scanning through their data and trimming outliers within their time series data. The outliers may then be deleted and summary statistical measures are then recalculated.

In another embodiment, the method of filtering may further include a second set of filtering. The second filter may include identifying potential outliers using detection techniques, such as, for example, Mahalanobis distance, Random Forests, t-tests, among others and re-estimating whether outliers still exist in the resulting dataset. This process may be performed iteratively until outliers are no longer detected. The potential outliers may be characterized as an error that is minimized via a control loop.

Referring back to FIG. 2A, the method 200 includes, in step 208, scoring the premises using the classified result data to determine, at the premises, at least one of: (i) a present state of an observable condition (i.e., a programmed thermostat is present), (ii) a non-present state of the observable condition, and (iii) a degree of a condition of the observable condition, to provide tailored consumer information associated to the consumer's usage of the commodity.

Using either types of clustering, new observations (e.g., new energy usage data and derivative features thereof) may be classified according to their nearest centroid, as calculated using a distance metric, and compared to the existing maps. Additionally, the new observations may be added to the maps.

According to another embodiment, the centroid or cluster may be stored. As such, new energy usage data 1004 may be mapped to the respective cluster to determine the status of the premises.

FIG. 2B is a schematic flowchart illustrating operations 210 of a computer-implemented method determining the status of a premises using clustering according to another illustrative embodiment. The method includes receiving energy usage data of a premises (step 212) and a set of representative self-organized map (step 214). The representative self-organized map may include at least one centroid that corresponds to a programmed thermostat or an unprogrammed thermostat (such as shown in FIGS. 4A-4C and 5A-5C). The computer system may determine a set of statistical features of the energy usage data including, for example, trend (raw), season daily (raw), season weekly (raw), season all (raw), serial correlation (raw), serial correlation (decomposed), non-linear auto-correlation (raw), non-linear auto-correlation (decomposed), skewness (raw), skewness (decomposed), kurtosis (raw), kurtosis (decomposed), long-range dependence (raw), and long-range dependence (decomposed) (step 216). The computer system may assign the statistical feature to a corresponding centroid in the representative self-organized map (step 218). Based on the assignment, the status of the premises as having a programmed or unprogrammed may be determined.

Model-Based Approach

As indicated, FIG. 7 illustrate a model-based approaches according to another embodiment to determine the status of the whether the controller adjusts the temperature according to a time-of-day dependent setting (i.e., the programmable thermostat is programmed). The computer system may receive the energy usage data of a premises (step 702) and calculate statistical data from the usage data (step 704). The computer system may apply the statistical data to a regression model (step 706). The regression model may have a set of model coefficients corresponding to a predictor variable of whether the premises has a programmed or unprogrammed thermostat. The regression model may be performed by minimizing a sum of squared error of predicted and actual value to classify the thermostat status. Such a regression model may be part of Lasso modeling.

The predictor variable may include seasonality, intercept, trend, decomposed data, kurtosis, skewness, serial correlation, non-linear autocorrelation, long range dependence, chaos, and sensitivity to heating and cooling at different periods of the day and/or year.

Figure 8A:
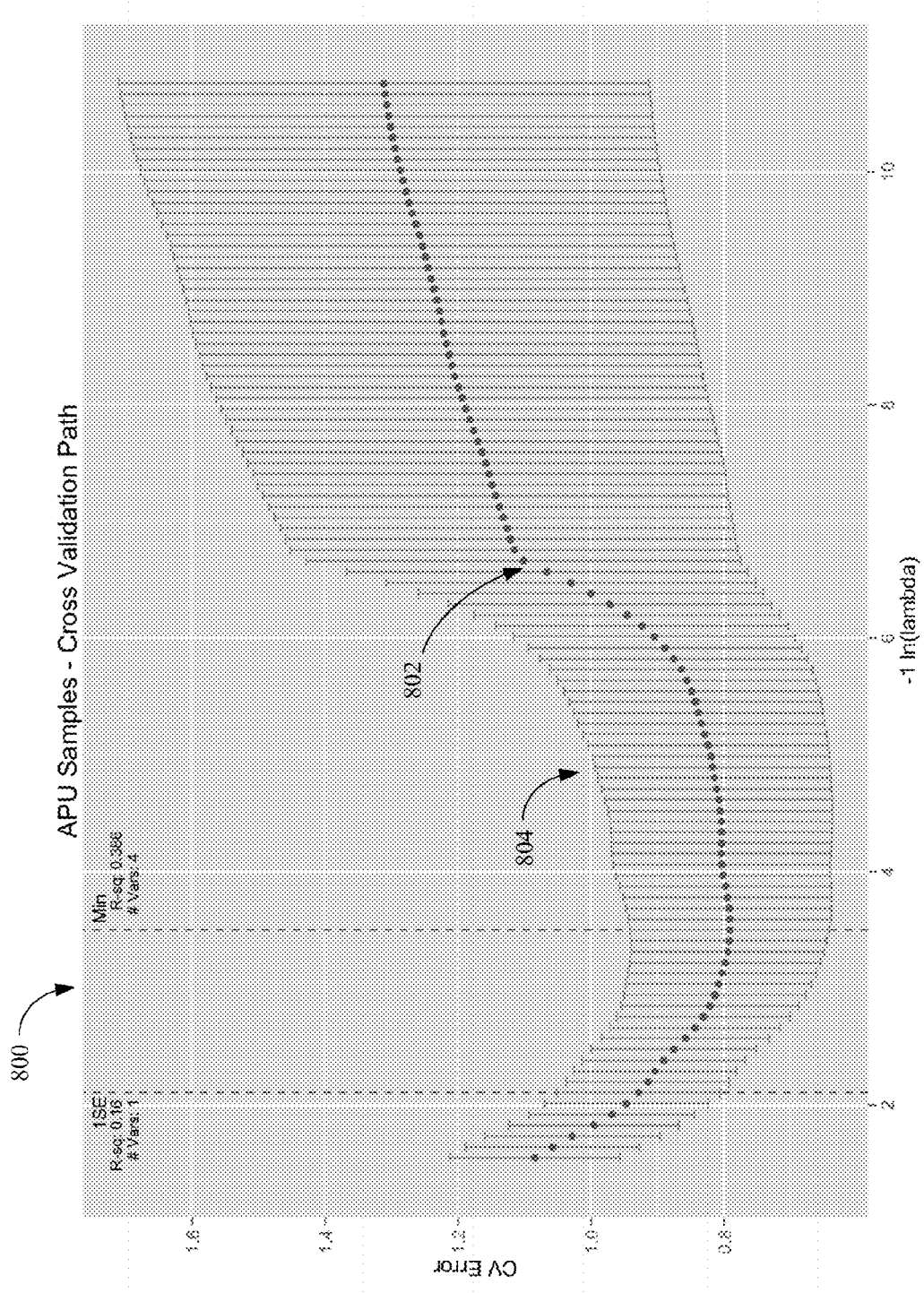
FIG. 8A shows a plot of cross-validation errors of a regression model and associated standard errors of the model according to an illustrative embodiment.
Figure 8B:
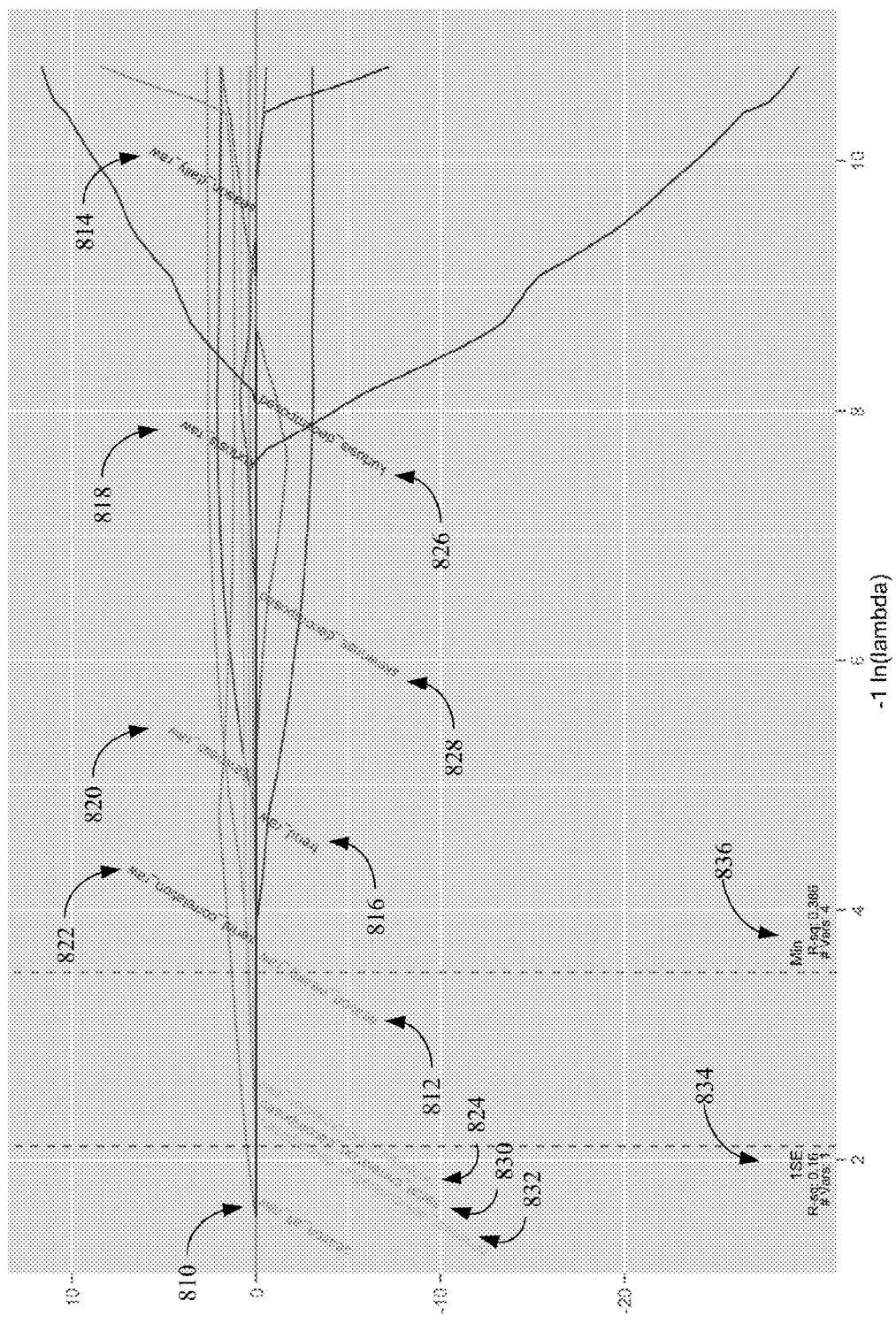
FIG. 8B shows predictive variables as used in a regression model and the result of varying penalty-parameters.

In one illustrative embodiment, the model may be implemented with at least one of the following parameters (see FIG. 8B).

Raw season (all) 810
Raw season (weekly) 812
Raw season (daily) 814
Raw Trend 816
Raw kurtosis 818
Raw skewness 820
Raw serial correlation 822
Raw non-linear autocorrelation 824
Decomposed kurtosis 826
Decomposed skewness 828
Decomposed serial correlation 830
Decomposed nonlinear autocorrelation 832

The computer system may filter outliers by including penalizing coefficients such that each variable's coefficient increases only to the extent that the corresponding reduction in error is greater than some penalty. Examples of such embodiments may include ridge, Lasso, and least angle regression. Put more plainly, if the variable isn't sufficiently predictive, it isn't allowed to enter the model. This process may be repeated for varying degrees of penalties, starting from a high penalty (i.e., where only one variable may enter the model) to very low penalty (i.e., where the standard least squares estimate is reduced by weighting). A penalty value (lambda) may be assigned to each set of coefficients. The coefficients may be used to trace the coefficient paths (how the coefficients change with the penalty) and the cross validation error path (how the model performs on the test and training data). The penalty parameter may be varied iteratively from zero to infinity, where at zero, the model is equivalent to a least-square estimate and where at infinity, the model coefficients are zero. Lambda is generally chosen to minimize the cross-validation error. A fast estimation algorithm may be employed, such as that disclosed in J. Friedman, T. Hastie, R. Tibshirani, Regularization Paths for Generalized Linear Models via Coordinate Descent, 33 JOURNAL OF STATISTICAL SOFTWARE, Issue 1 (January 2010), which is herein incorporated in its entirety.

In an embodiment, the cross validation path is employed to select the regression model. The model may be selected if the model minimizes the cross validation error (referred to as Min below), or if the cross validation error is within one standard deviation of the Min model (referred to as 1SE below). These models may a portion of the calculated statistical features to prevent or reduce overfitting of the model. The models may be employed without certain regressors to be more robust to outliers.

FIG. 8A shows a plot 800 of cross validation errors 802 of the regression model and associated standard error 804 of the cross validation error of the model according to the illustrative embodiment. As shown, the validation error 802 is low, thus is indicative of a good prediction of the predictive mode. The model employs variables directed to seasonality, intercepts, decomposed non-linear autocorrelation, decomposed serial correlation, and raw non-linear autocorrelation. Exemplary coefficient values of raw seasonality data may vary from 0.0 to 1.5. Exemplary coefficient values of intercepts may vary from −1.75 to 0.0. Exemplary coefficient values of decomposed non-linear autocorrelation may vary from 0.0 to 0.5. Exemplary coefficient values of decomposed serial correlation may vary from 0.0 to 0.5. Exemplary coefficient values of raw non-linear autocorrelation may vary from 0.0 to 0.25.

The plot 800 shows the cross validation error (as dots 802), and the associated standard error of the cross validation error (as error bars 804) for each value along the regularization path. The path starts at the left with a high penalty and decreases until the penalty is zero (at the right). At the start of the path, the cross validation error decreases as more variables enter the model and the predictive power increases. After variables are entered (to the right of the Min line), the model starts to over-fit and the test error begins increasing more than the training error decreasing. Thus, as shown, the model has some degree of predictive-ness with a high variability in outcome (e.g., wider error bars).

Further, by plotting each of the coefficients at every lambda, it is observed that overfitting the regression model degrades the accuracy of the model.

FIG. 8B shows the predictive variable as used in the model and the results of varying the penalty parameter for each variable. The location of the label for each variable further indicates the value of corresponding lambda value (i.e., the penalty) at which the variable enters the model. The penalty is shown decreasing from the left to the right portion of the figure. The results show that raw seasonal_all 810, decomposed non-linear autocorrelation 832, decomposed serial correlation 830, and raw non-linear autocorrelation coefficients may be good predictors for model 834 (see label "1SE") and model 836 (see label "Min"). Of course, coefficients of other predictors may be employed using the training described herein.

It is noted that a radical change in the predictive variables as the penalty approaches zero may indicate the presence of outliers in a dataset. As shown, at high penalties, several coefficients do not enter the model, but once they do, their predictive variable reach levels that are over an order of magnitude greater than the other coefficients, thereby limiting the predictive power of a model.

Referring back to FIG. 7, the computer system may score the premises using the coefficients to determine a present state or a non-present state of an observable condition at the premises (step 708). The status may then be used to provide tailored consumer information to the consumer. For a given customer "i", the score, as shown in Equation 1, may be the sum of the product of the observed values, "$v_{i,a}$", and the estimated coefficients "$k_{i,a}$" for each coefficient number "a", where there are j number of estimated coefficients.

$$\text{Score}_i = \Sigma_{a=1}^{j} k_{i,a} \times v_{i,a} \quad \text{(Equation 1)}$$

Customers with scores (Score) greater than a pre-defined threshold, $T_{state}$, is indicated to have a programmed thermostat, as shown in Equation 2.

$$\text{State}_{present} = \text{Score}_i > T_{state} \quad \text{(Equation 2)}$$

In an alternate embodiment, coefficient of penalized regression model may be used to validate other dimension reduction methods. An example is Principal Components techniques (PCA).

Hybrid-Based Approach

The described clustering and hybrid-based approaches may be singularly employed or operate in combination.

FIG. 9 is a schematic flowchart illustration operation of a computer-implemented method 900 to determine the status of a premises using a combination of clustering and regresio models according to another illustrative embodiment. The computer system may receive the energy usage data (step 902) and calculate, from the usage data, statistical data (step 904), such as seasonality, trend, decomposed data, kurtosis, skewness, serial correlation, non-linear autocorrelation, long range dependence, and chaos.

The computer system may classify the statistical data to generate classified result data by clustering the statistical data (step 906). Clustering may be performed based upon at least one of k-means, hierarchical clustering, Kohonen self-organizing maps, and other neural networks, as discussed.

The computer system may apply the classified result data to a regression model (step 906). The regression model may be performed by minimizing a sum of squared error of predicted and actual value to classify the thermostat status. Such regression model may be part of Lasso modeling.

The method then includes scoring 910 the premises using the coefficients to determine a present state or a non-present state of an observable condition at the premises to provide tailored consumer information to the consumer.

In another embodiment, a regression model may be associated with a given cluster in a clustering map. Based upon the assignment of the energy usage data to the cluster, the regression model corresponding thereto may be applied to the data.

Rule-Based Approach

In an alternate embodiment, a computer-implemented method 900 of reducing commodity usage may be employed based upon rules. Refer to as "change-point," the rule-based approach classifies programmed thermostats by identifying households that have relatively high morning to midday and evening to midday usage ratios. Specifically, in many cases, a programmed thermostat exhibits consistently higher usage in the morning and in the evening than during the day. The "bcp" package in R-package may be used, for example, to generate FIG. 6, which employs the method described in C. Erdman and J. Emerson, An {R} Package for Performing a Bayesian Analysis of Change Point Problems, 23 JOURNAL OF STATISTICAL SOFTWARE 3, 1-13 (2007), which is incorporated herein in its entirety. This approach may be characterized as "rule-based."

The method includes calculating a ratio of morning usage to mid-day usage and a ratio of mid-day usage data to evening usage. The method then includes classifying the customers into a plurality of rule-based tiers, including programmed, not-programmed, and unknown, based upon a comparison of the usage data to the rules. It is observed, in several geographic locations, that the ratio of usage data between evening and morning is the highest starting in the evening and continues until midnight.

Figure 6:
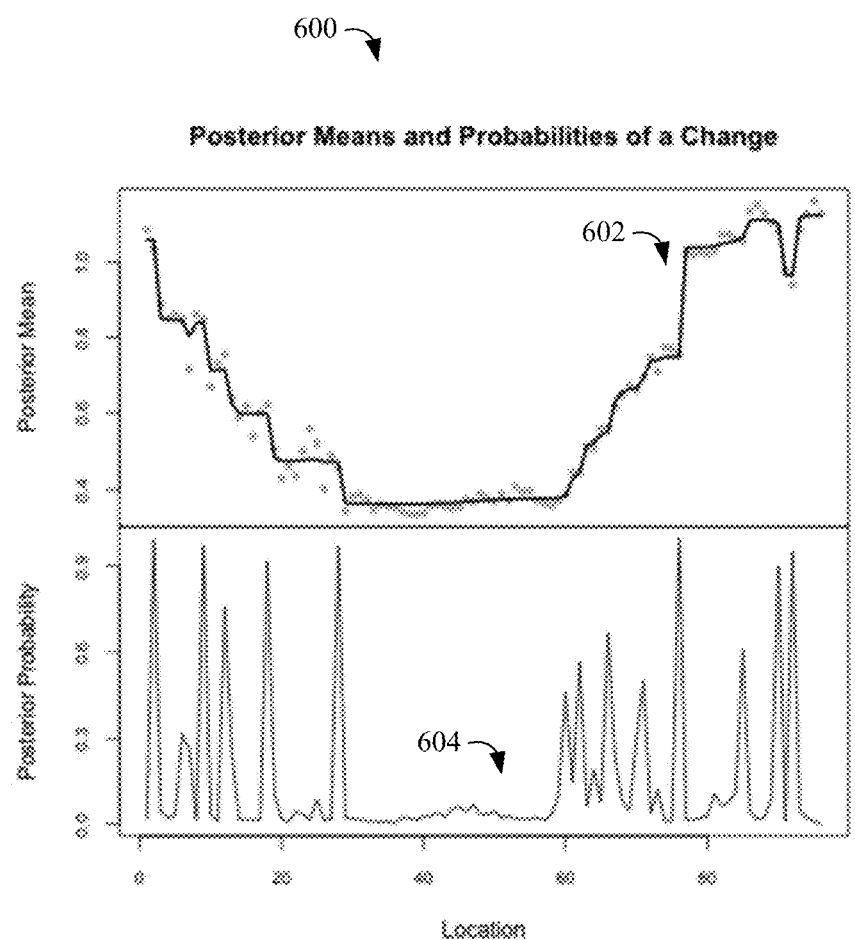
FIG. 6 shows a plot of a probability of a change-point for a rule-based method to determine the status of the premises according to an alternate embodiment.

FIG. 6 shows a plot of a probability of a point change for a rule based method 600 to determine the status of a premises. An average of the usage data 602 is mapped over a day. The probability function 604 is calculated from an average 602 by calculating the change in slope of the data.

The rules may be implemented as a look-up table or a transfer function.

Figure 10A:
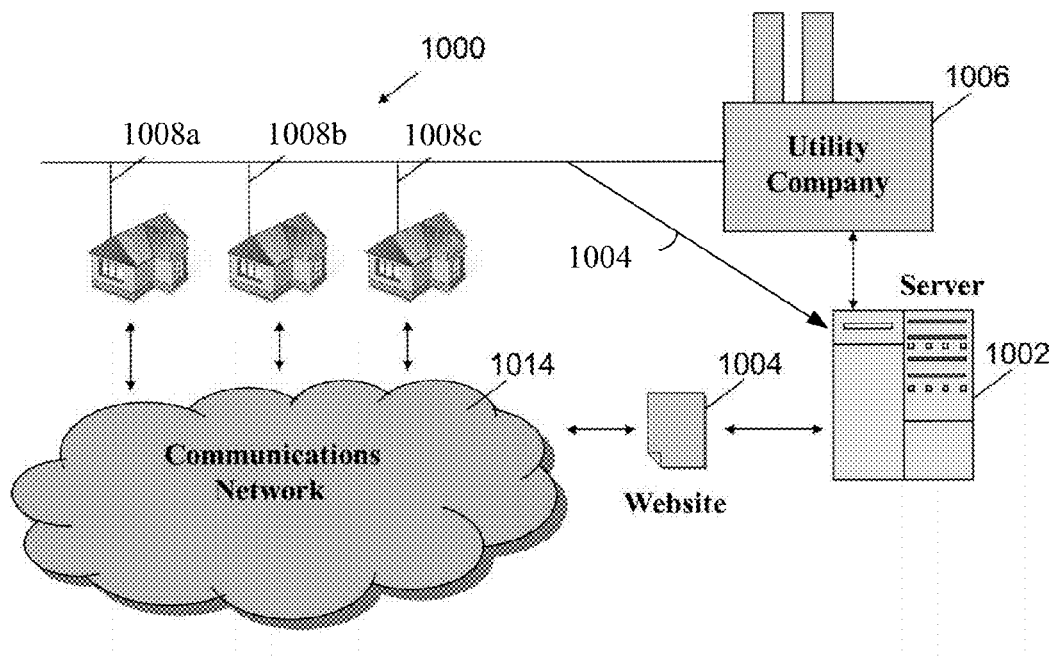
FIG. 10A illustratively shows a system that utilizes the methods according to the various embodiments.
Figure 10B:
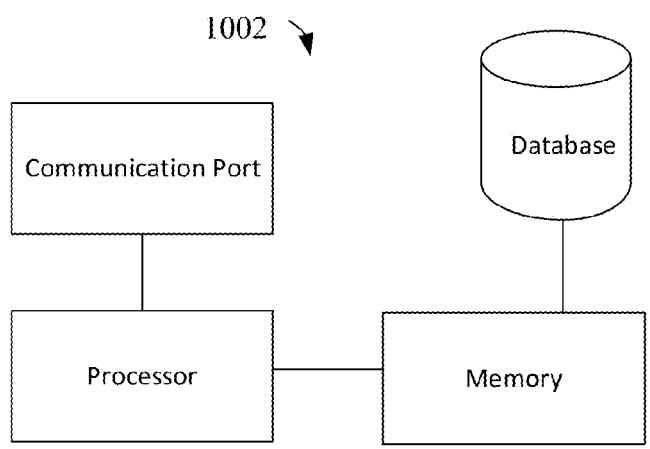
FIG. 10B is a schematic illustratively showing a computer system according to the various embodiments.
Figure 10C:
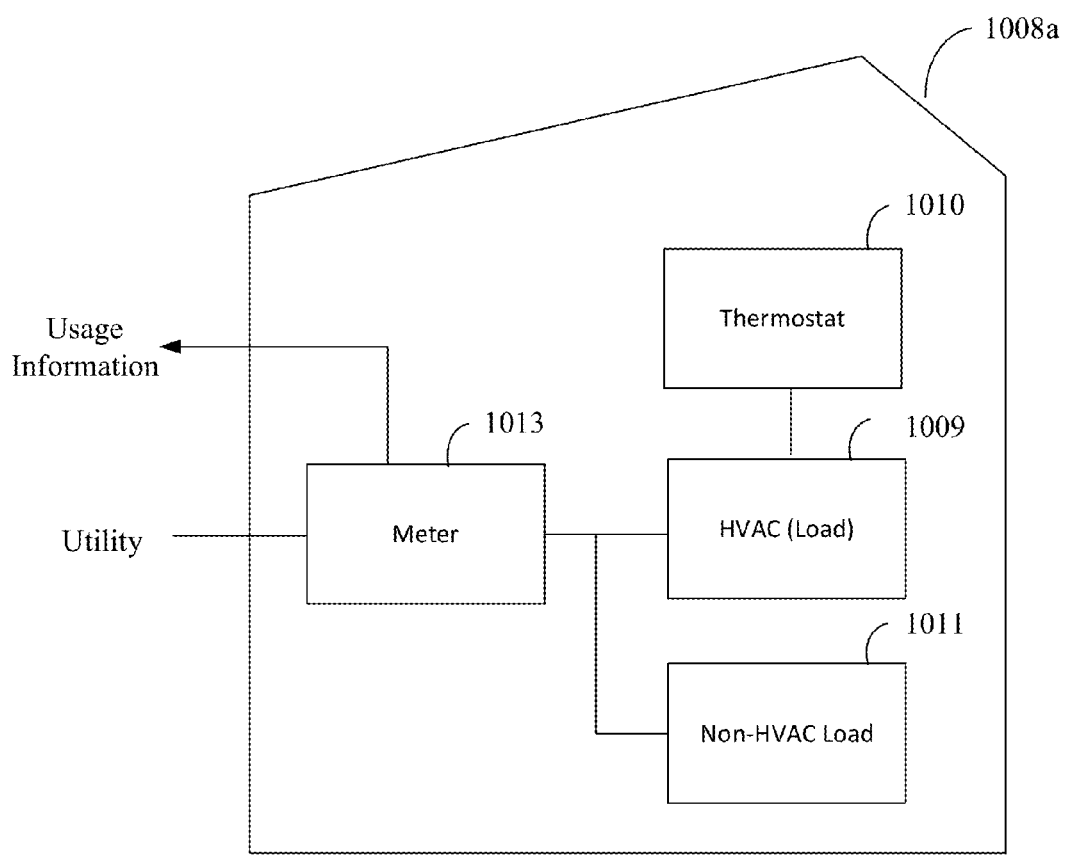
FIG. 10C is a schematic illustratively showing a premises according to the various embodiments.

FIG. 10A is a schematic block diagram of a system 1000 that utilizes the methods according the various embodiments. The utility collects data from the premises 1008a-1008c. In system 1000, a server 1002 receive data (i.e., historical and usage information) from a utility 1006. The server 1002 performs the computer-implemented method described above. The server 1002 may communicate the information to customers associated with those buildings 1008a-1008c. In various embodiments, the server 1002 communicates the report via the communications network 1014, which may be the Internet, for example. The server 1002 may send the report in an e-mail or make it available on a server supported website 1004 for the customer to log into view. The server 1002 may print the report or provide the information to a printing system so that the data can be provided to the customers via regular mail (e.g., as part of a utility bill). The report may also be communicated to the utility company 1006 for them to provide the report or alert to the customers. In alternate scenarios, the servers 1002 may fetch the data directly from the premises 1008a-1008c.

Figure 13:
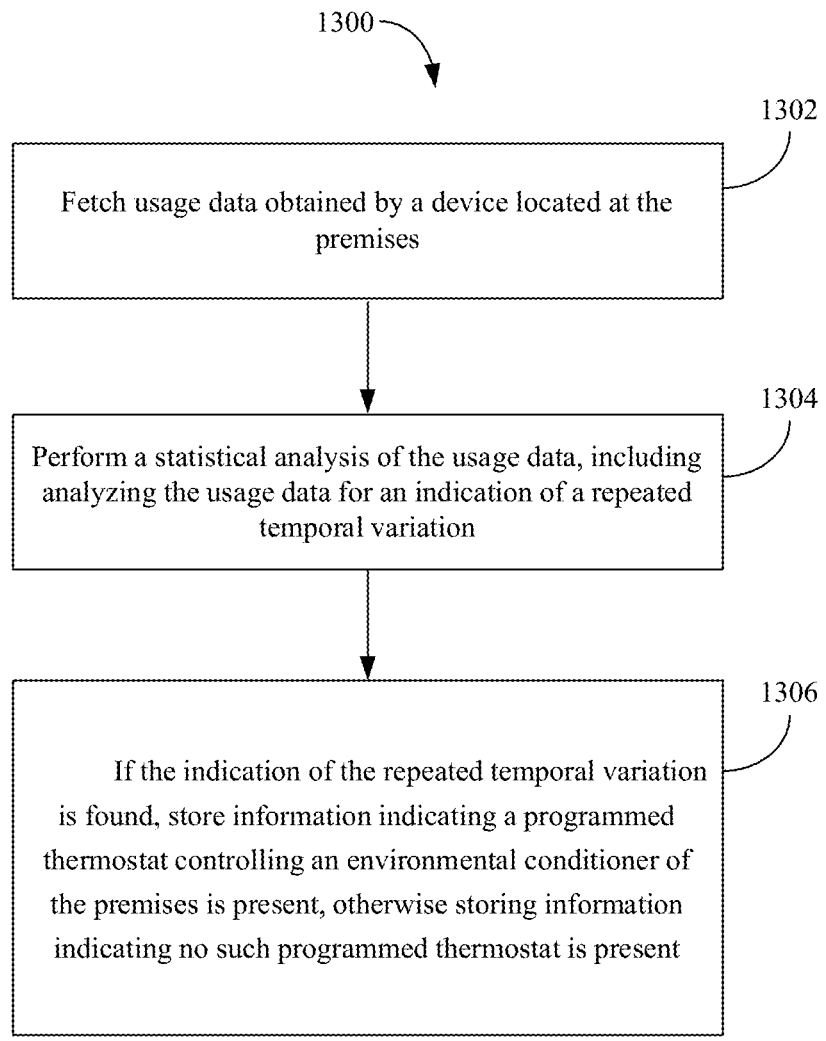
FIG. 13 is a schematic flowchart illustrating operations of a computer-implemented method of reducing commodity usage according to an illustrative embodiment.

FIG. 13 is a schematic flowchart illustrating operation of a computer-implemented method 1300 of reducing commodity usage according to another illustrative embodiment. The method 1300 includes fetching 1302 usage data obtained by a device located at the premises. Fetching 1302 the usage data may include fetching data indicating an amount of energy usage. Fetching 1302 the usage data may alternatively include fetching data indicating a plurality of calls for activation of the environmental conditioner.

The method 1300 then includes, at a location remote from the premises, performing a statistical analysis of the usage data (step 1304), including analyzing the usage data for an indication of a repeated temporal variation therein. The method 1300 then includes, if the indication of the repeated temporal variation is found, storing information indicating a programmed thermostat controlling an environmental conditioner of the premises is present (step 1306), otherwise storing information indicating no such programmed thermostat is present. The method 1300 may further include, if the stored information indicates no such programmed thermostat is present, generating a message recommending usage of a programmed thermostat; and sending the message to a consumer associated with the premises. The method 1300 may also include, if the stored information indicates a programmed thermostat is present, further analyzing the usage data for an indication of excessive energy usage by the environmental conditioner. If the indication of excessive energy usage is found, the method 1300 then includes generating a message recommending a course of action for reducing energy usage and sending the message to a consumer associate with the premises.

A number of observable conditions may be made using the described method. For example, the observable condition may include whether the premises has a programmed thermostat. The method may also be employed to determine:
- whether the consumer on the premises is present;
- the number of consumer present on the premises;
- whether the premises has an electric water heater;
- whether the premises has a malfunctioning heating, ventilation, or air-conditioning (HVAC) system;
- the degree of the malfunction in the heating, ventilation, or air-conditioning (HVAC) system; and
- the control set-point of the thermostat.

Figure 11:
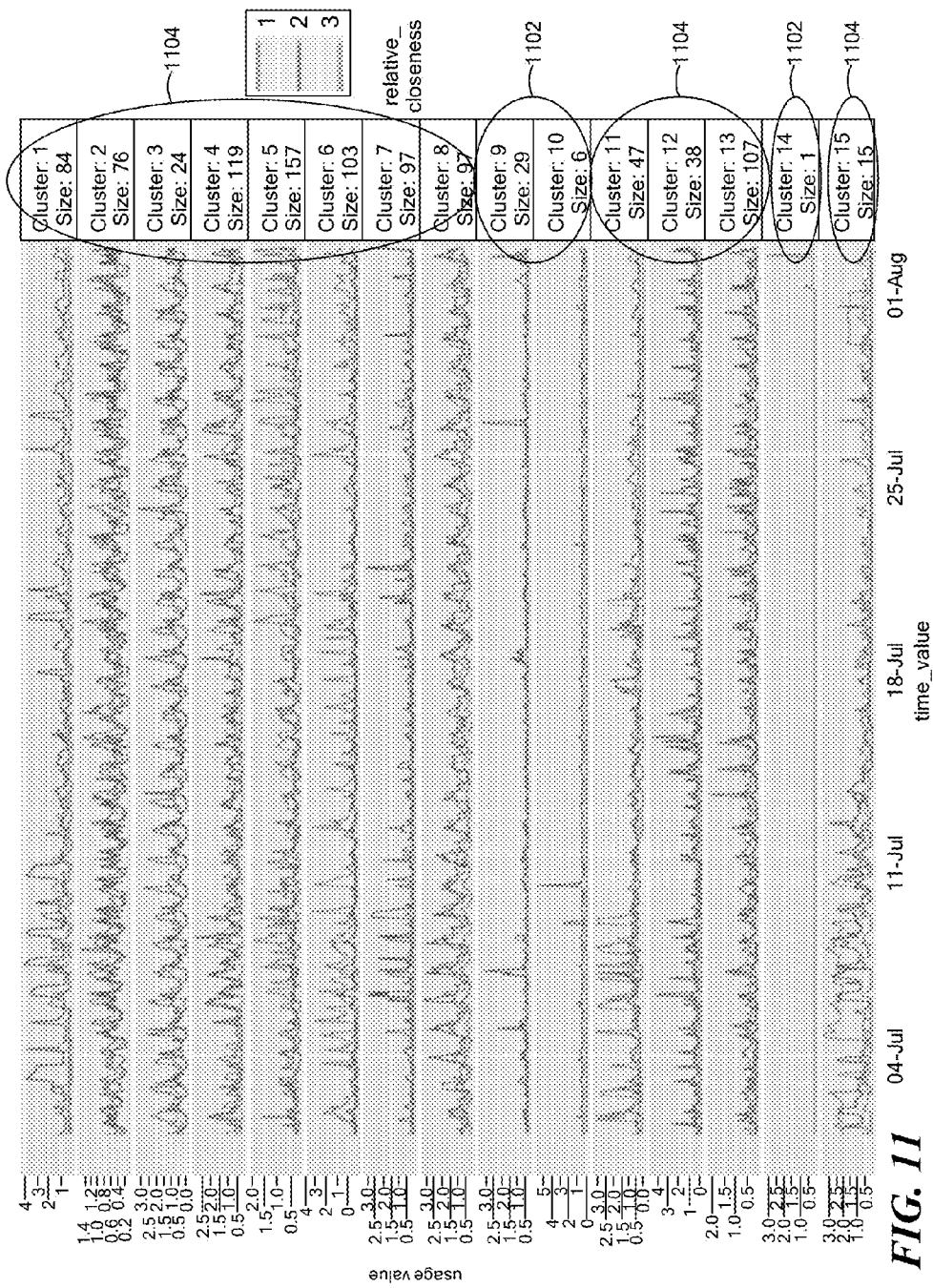
FIG. 11 shows a plot of clustered statistical usage data for empty homes according to an alternate embodiment.

For example, FIG. 11 shows a plot of clustered statistical usage data for empty homes. The item 1102 annotates clusters having of empty premises (i.e., no consumer present on the premises) and item 1104 annotates clusters of non-empty premises (i.e., a consumer is present at each premises). The embodiments may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment, predominantly all of the described logic is implemented as a set of computer program instructions that is converted into a computer executable form, stored as such in a computer readable medium, and executed by a microprocessor under the control of an operating system.

It should be noted that terms such as "processor" and "server" may be used herein to describe devices that may be used in certain embodiments and should not be construed to limit it to any particular device type or system unless the context otherwise requires. Thus, a system may include, without limitation, a client, server, computer, appliance, or other type of device. Such devices typically include one or more network interfaces for communicating over a communication network and a processor (e.g., a microprocessor with memory and other peripherals and/or application-specific hardware) configured accordingly to perform device and/or system functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internetworking technologies.

It should also be noted that devices may use communication protocols and messages (e.g., messages created, transmitted, received, stored, and/or processed by the system), and such messages may be conveyed by a communication network or medium. Unless the context otherwise requires, the embodiments should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments may be implemented as a combination of both software (e.g., a computer program product) and hardware. Still other embodiments are implemented as entirely hardware, or entirely software.

It should also be noted that logic flows may be described herein to demonstrate various aspects of the embodiments, and should not be construed to limit the present embodiment to any particular logic flow or logic implementation. The described logic may be partitioned into different logic blocks (e.g., programs, modules, interfaces, functions, or subroutines) without changing the overall results or otherwise departing from the true scope of the embodiments. Often times, logic elements may be added, modified, omitted, performed in a different order, or implemented using different logic constructs (e.g., logic gates, looping primitives, conditional logic, and other logic constructs) without changing the overall results or otherwise departing from the true scope of the embodiments.

The embodiments described above are intended to be merely exemplary; numerous variations and modifications will be apparent to those skilled in the art. All such variations and modifications are intended to be within the scope of the present embodiments.

What is claimed is:

1. A computer-implemented method, the computer-implemented method comprising:
    receiving energy usage data of a consumer associated to a premises, the premises having a controller to regulate temperature in a controlled space within the premises, the energy usage data representing energy usage being associated, in part, to regulation of the controller;
    analyzing, via a processor, the energy usage data to determine whether the controller is a programmed thermostat or an unprogrammed thermostat;
    wherein the analyzing includes determining, via the processor, whether the energy usage data indicates that the energy usage adjusts in a pattern according to a time-of-day dependent setting;
    generating, via the processor, a status that indicates the controller at the premises is the programmed thermostat in response to determining that the energy usage adjusts in the pattern; and
    generating, via the processor, the status that indicates the controller is the unprogrammed thermostat in response to determining that the energy usage does not adjust in the pattern.

2. The computer-implemented method of claim 1, wherein determining whether the energy usage data indicates that the energy usage adjusts in the pattern according to the time-of-day dependent setting includes:
    comparing a first statistical feature derived from the received energy usage data to a second statistical feature derived from at least one representative pattern of a premises with a controller that adjusts temperature according to a time-of-day dependent setting.

3. The computer-implemented method of claim 1, further comprising providing, based on the generated status, tailored consumer information to the customer associated with the premises including:
    outputting a report to the consumer at the premises based on the generated status, the report including, at least one of:
    a message indicating at least one of an estimated reduction in usage of the commodity and an estimated reduction in cost associated with the estimated reduction in usage if the programmed thermostat is employed at the premises; and
    an indication of a presence of a malfunctioned HVAC at the premises.

4. The computer-implemented method of claim 1, wherein the energy usage data is retrieved from at least one of an advanced meter infrastructure (AMI) meter and a home display system located at the premises.

5. The computer-implemented method of claim 1, wherein analyzing the energy usage data includes:
    calculating, from the energy usage data, statistical data related to at least one of seasonality, trend, or decomposed data;
    assigning the calculated statistical data to a representative self-organized map, the self-organized map having at least one cluster corresponding to a second premises having a programmed thermostat or an unprogrammed thermostat;
    wherein the representative self-organized map is determined from at least one of k-means, hierarchical clustering, or Kohonen self-organizing maps.

6. The computer-implemented method of claim 5, wherein the representative self-organizing map includes at least one of a Kohonen supervised self-organizing maps and a Kohonen unsupervised self-organizing map.

7. The computer-implemented method of claim 5, wherein the representative self-organizing map corresponds to a neighborhood associated to the premises.

8. The computer-implemented method of claim 1, wherein analyzing the energy usage data includes:
    calculating, from the energy usage data, statistical data related to at least one of seasonality, trend, decomposed data, kurtosis, skewness, serial correlation, non-linear autocorrelation, long range dependence, or chaos;
    applying the statistical data to a regression model, the regression model having a plurality of model coefficients corresponding to a predictor variable that represents if the energy usage data indicates that the energy usage adjusts in the pattern according to a time-of-day dependent setting, the applying being based on the received energy usage data;
    scoring the premises using the model coefficients to determine whether the controller adjusts temperature according to the time-of-day dependent setting.

9. The computer-implemented method of claim 8, wherein the regression model includes minimizing a sum of squared error between a predicted and an actual value.

10. The computer-implemented method of claim 8 further comprising:
    filtering, prior to applying the calculated statistical data to the regression model, a portion of the statistical data that is insufficiently predictive based upon radical change in the model coefficient.

11. The computer-implemented method of claim 10, wherein filtering is performed by at least one of a ridge estimator, a Lasso estimator, and a least angle regression estimator.

12. The computer-implemented method of claim 8, wherein the predictor variable includes at least one parameter corresponding to seasonality, intercept, trend, decomposed data, kurtosis, skewness, serial correlation, non-linear autocorrelation, long range dependence, chaos, and sensitivity to heating and cooling.

13. A system comprising:
one or more processors; and
memory including instructions that, upon being executed by the one or more processors, cause the system to:
receive energy usage data of a consumer associated to a premises, the premises having a controller to regulate temperature in a controlled space within the premises, the energy usage data being associated, in part, to regulation of the controller;
analyze the energy usage data to determine whether the controller is a programmed thermostat or an unprogrammed thermostat by determining, via the processor, whether the energy usage data indicates that the energy usage adjusts in a pattern according to a time-of-day dependent setting; and
generating, via the processor, a status that indicates the controller as the programmed thermostat or the unprogrammed thermostat based at least in part on the analysis.

14. The system of claim 13, wherein the memory further including instructions that, upon being executed by the one or more processors, cause the system to generate and provide tailored consumer information to a consumer associated with the premises based on the determined status of the controller, wherein the tailored information represents at least a usage of energy at the premises.

15. The system of claim 13, wherein the instructions upon being executed further cause the system to:
calculate a ratio of usage in an evening time period and usage in a morning time period; and
compare the calculated ratio to a user-specific threshold, wherein the comparison provides the status of whether the controller adjusts the temperature according to the time-of-day dependent setting.

16. The system of claim 13, wherein the instructions upon being executed further cause the system to:
compare a first statistical feature derived from the received energy usage data to a second statistical feature derived from at least one representative pattern of a premises with the controller.

17. The system of claim 13, wherein the energy usage data is retrieved from at least one of an advanced meter infrastructure (AMI) meter and a home display system located at the first premises.

18. The system of claim 13, wherein the memory further comprising instructions that when executed by the one or more processors cause the processors to analyze the energy usage data by:

calculating, from the energy usage data, statistical data related to at least one of seasonality, trend, decomposed data, kurtosis, skewness, serial correlation, non-linear autocorrelation, long range dependence, or chaos; and
assigning the calculated statistical data to a representative self-organized map, a portion of the representative self-organized map having a cluster having an associated regression model.

19. The system of claim 18, wherein the representative self-organizing map includes at least one of a Kohonen supervised self-organizing maps or a Kohonen unsupervised self-organizing map.

20. The system of claim 18, wherein the representative self-organizing map corresponds to a neighborhood associated to the first premises.

21. A computer-implemented method of remotely ascertaining presence of a programmed thermostat controlling an environmental conditioner at a premises, the method comprising:
fetching, by at least a processor using a network communication, energy usage data from a device located at the premises, wherein the energy usage data includes data representing usage of energy over a plurality of time periods;
performing, by at least the processor, a statistical analysis of the energy usage data including analyzing the energy usage data for an indication of a repeated temporal variation in the usage of the energy based on a time periodic pattern of the usage;
if the indication of the repeated temporal variation is found, generating information indicating that the premises includes a programmed thermostat for controlling the environmental conditioner of the premises; and
if the indication of the repeated temporal variation is not found, generating information indicating that the premises includes an unprogrammed thermostat for controlling the environmental conditioner of the premises.

22. The method according to claim 21, further comprising, if the stored information indicates the unprogrammed thermostat is present: generating a message recommending usage of a programmed thermostat; and sending the message to a consumer associated with the premises.

23. The method according to claim 21, further comprising,
if the stored information indicates the programmed thermostat is present: further analyzing the energy usage data for an indication of excessive energy usage by the environmental conditioner;
if the indication of excessive energy usage is found, generating a message recommending a course of action for reducing energy usage; and
sending the message to a consumer associate with the premises.

* * * * *